(12) United States Patent
Hirasawa

(10) Patent No.: US 10,574,972 B2
(45) Date of Patent: Feb. 25, 2020

(54) IMAGE PROCESSING DEVICE, IMAGE PROCESSING METHOD, AND IMAGING DEVICE

(71) Applicant: SONY CORPORATION, Tokyo (JP)

(72) Inventor: Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 177 days.

(21) Appl. No.: 15/032,549

(22) PCT Filed: Nov. 17, 2014

(86) PCT No.: PCT/JP2014/080323
§ 371 (c)(1),
(2) Date: Apr. 27, 2016

(87) PCT Pub. No.: WO2015/093205
PCT Pub. Date: Jun. 25, 2015

(65) Prior Publication Data
US 2016/0261852 A1  Sep. 8, 2016

(30) Foreign Application Priority Data

Dec. 16, 2013  (JP) .................................. 2013-259075

(51) Int. Cl.
*H04N 13/271* (2018.01)
*H04N 13/25* (2018.01)
(Continued)

(52) U.S. Cl.
CPC .......... *H04N 13/271* (2018.05); *G01B 11/24* (2013.01); *G01C 3/08* (2013.01); *G06K 9/6202* (2013.01);
(Continued)

(58) Field of Classification Search
CPC ............. H04N 13/0271; H04N 13/025; H04N 13/0022; H04N 2013/0081; G06T 7/55;
(Continued)

(56) References Cited

U.S. PATENT DOCUMENTS

2010/0073364 A1* 3/2010 Jung ..................... G06T 7/0085
345/419
2010/0289878 A1* 11/2010 Sato ..................... H04N 13/239
348/46
(Continued)

FOREIGN PATENT DOCUMENTS

| JP | 11-211433 | 8/1999 |
| JP | 2010-256138 | 11/2010 |
| WO | WO2009/147814 A1 | 12/2009 |

OTHER PUBLICATIONS

English Translation of Japanese Publication JP 2010-256138 Nov. 2010.*
(Continued)

*Primary Examiner* — Loi H Tran
(74) *Attorney, Agent, or Firm* — Paratus Law Group, PLLC

(57) ABSTRACT

A depth map generation unit (15) generates a depth map through a matching process using a first image generated by a first imaging unit which has a pixel configuration including pixels having different polarization directions and a second image generated by a second imaging unit which has a different pixel configuration from the pixel configuration of the first imaging unit. A normal-line map generation unit (17) generates a normal-line map based on a polarization state of a polarized image of at least one of the first and second images. A map unifying unit (19) performs a process of unifying the generated depth map and the generated normal-line map and acquires an image in which the number of pixels is not reduced while generating the depth map with (Continued)

precision equal to or greater than the generated depth map. The image in which the number of pixels is not reduced can be acquired while generating the highly precise depth map.

20 Claims, 21 Drawing Sheets

(51) Int. Cl.
  *G01B 11/24* (2006.01)
  *G01C 3/08* (2006.01)
  *G06K 9/62* (2006.01)
  *H04N 13/128* (2018.01)
  *H04N 13/00* (2018.01)

(52) U.S. Cl.
  CPC ........... *H04N 13/25* (2018.05); *H04N 13/128* (2018.05); *H04N 2013/0081* (2013.01)

(58) Field of Classification Search
  CPC ........ G06K 9/6202; G01C 11/30; G01C 3/08; G01B 11/24
  USPC .......................................................... 348/47
  See application file for complete search history.

(56) References Cited

U.S. PATENT DOCUMENTS

| | | |
|---|---|---|
| 2013/0010106 A1 | 1/2013 | Yokota |
| 2013/0016189 A1* | 1/2013 | Hosaka .................. G03B 35/08 348/49 |
| 2013/0033575 A1* | 2/2013 | Kobayashi ............. G02B 27/26 348/46 |

OTHER PUBLICATIONS

Jul. 6, 2017, EP communication issued for related EP application No. 14871842.2.

Apr. 28, 2018, Chinese Office Action issued for related CN Application No. 201480067375.8.

* cited by examiner (A)            (B)

FIG. 10
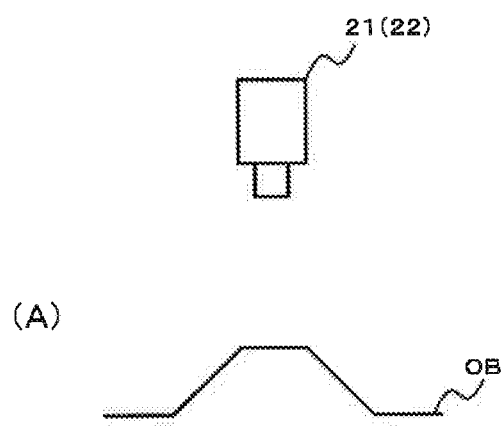
(A)
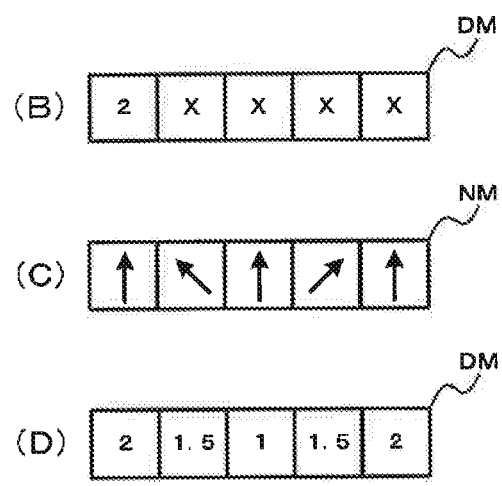
(B)
(C)
(D)
FIG. 11
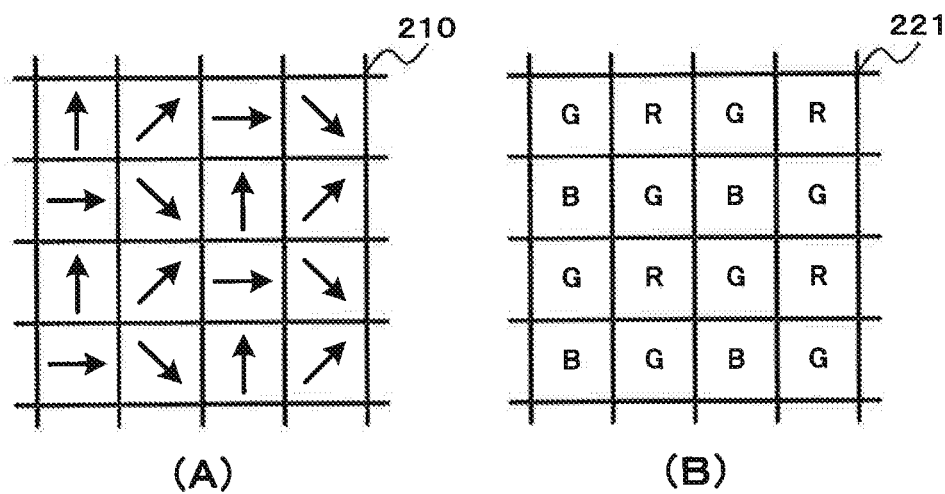
(A)  (B)

(A)   (B)

(A)   (B)

FIG. 19
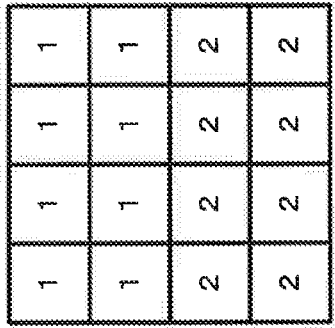
(C)
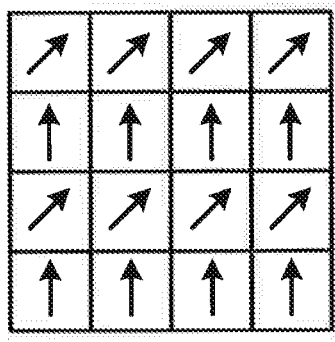
(B)
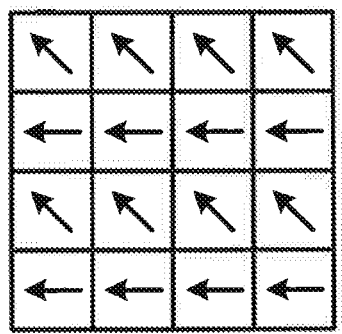
(A)
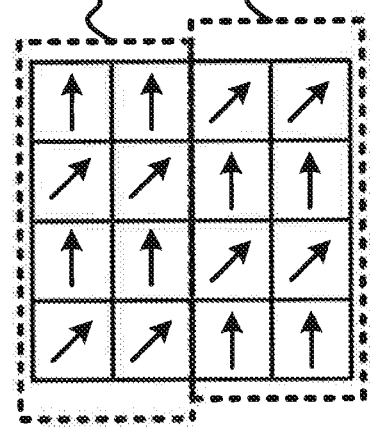
(D)

(A)　　　　　　　　(B)

(A)　　　　　　　　(B)

IMAGE PROCESSING DEVICE, IMAGE PROCESSING METHOD, AND IMAGING DEVICE

CROSS REFERENCE TO PRIOR APPLICATION

This application is a National Stage Patent Application of PCT International Patent Application No. PCT/JP2014/080323 (filed on Nov. 17, 2014) under 35 U.S.C. § 371, which claims priority to Japanese Patent Application No. 2013-259075 (filed on Dec. 16, 2013), which are all hereby incorporated by reference in their entirety.

TECHNICAL FIELD

The present disclosure relates to an image processing device, an image processing method, and an imaging device configured to acquire an image of which the number of pixels is not reduced while generating a highly precise depth map.

BACKGROUND ART

In recent years, means for simply acquiring 3-dimensional shapes has been requested along with lower priced 3D printers.

As means for acquiring the 3-dimensional shapes of subjects, there are active and passive schemes. The active schemes are, for example, schemes of irradiating subjects with light and acquiring 3-dimensional shapes based on reflected light from the subjects and are not simple schemes in terms of power consumption, component cost, or the like. In contrast to the active schemes, the passive schemes are schemes of acquiring 3-dimensional shapes without irradiating subjects with light and are simpler schemes than the active schemes. As the passive methods, for example, a scheme of generating a depth map by requesting correspondence between images using stereo cameras and a scheme of acquiring polarized mages in a plurality of directions and generating a normal-line map are used.

In the scheme using a stereo camera in the passive schemes, a problem that the depth of a flat portion of a subject may not be acquired is known. In the scheme using a polarized image in a plurality of directions, the fact that the relative surface shape of a subject can be acquired, but an absolute distance may not be acquired is known. Further, in the scheme using a polarized image in a plurality of directions, the fact that there is the uncertainty of 180 degrees at an azimuth angle of the normal line of a subject is known. Accordingly, in Patent Literature 1, by disposing polarization filters having different polarization directions in pixels of an image sensor mounted on an individual camera of a stereo camera, acquisition of a depth map by the stereo camera and acquisition of a normal-line map by polarization imaging are simultaneously performed. Further, in Patent Literature 1, the uncertainty of 180 degrees in the normal-line map can be solved and an absolute distance can be acquired by referring to a depth map.

CITATION LIST

Patent Literature

Patent Literature JP 2009-147814A

SUMMARY OF INVENTION

Technical Problem

Incidentally, in Patent Literature 1, a configuration in which four pixels are set as units of images and polarizers having different polarization directions are provided in four pixels is used. Accordingly, in such a configuration, the number of pixels of a polarized image having a specific polarization direction becomes (¼) of the number of pixels of an original image sensor, and thus a highly precise depth map may not be generated. Since the number of pixels is reduced, image quality also degrades as a normal image.

Accordingly, it is desirable to provide an image processing device, an image processing method, and an imaging device capable of acquiring an image of which the number of pixels is not reduced while generating a highly precise depth map.

Solution to Problem

A first aspect of the present technology resides in an image processing device including: a depth map generation unit configured to generate a depth map through a matching process using a first image generated by a first imaging unit which has a pixel configuration including pixels having different polarization directions and a second image generated by a second imaging unit which has a different pixel configuration from the pixel configuration of the first imaging unit; a normal-line map generation unit configured to generate a normal-line map based on a polarization state of a polarized image of at least one of the first and second images generated by the depth map generation unit; and a map unifying unit configured to perform a process of unifying the depth map generated by the depth map generation unit and the normal-line map generated by the normal-line map generation unit.

According to the present technology, the depth map is generated through the matching process using the first image generated by the first imaging unit which has the pixel configuration including pixels having different polarization directions and the second image generated by the second imaging unit which has a different pixel configuration from the pixel configuration of the first imaging unit. For example, when the first image is an image generated by the first imaging unit including the pixels having three or more polarization directions and the second image is an image generated by the second imaging unit including pixels with no polarization characteristics, an unpolarized image is generated from the first image and the matching process is performed using edge-extracted images of the unpolarized image and the second image.

When the first image is an image generated by the first imaging unit which has a pixel configuration including a first pixel group formed by pixels with polarization characteristics and a second pixel group formed by pixels having a polarization direction different from the polarization direction of the first pixel group or pixels with no polarization characteristics and the second image is an image generated by the second imaging unit which has a pixel configuration including a third pixel group formed by pixels having a different polarization direction from the polarization direction of the first image at a position corresponding to the first pixel group and a fourth pixel group formed by pixels with the same configuration as the configuration of the second pixel group at a position corresponding to the second pixel group or pixels with no polarization characteristics, the matching process is performed between images having the same polarization direction or images with no polarization characteristics by using an image of the second pixel group in the first image and an image of the fourth pixel group in the second image.

The normal-line map is generated based on the polarization state of the polarized image having three or more polarization directions of at least one of the first and second images. For example, when the first image is an image generated by the first imaging unit including the pixels having three or more polarization directions, the normal-line map is generated based on the first image.

When the first image is an image generated by the first imaging unit which has a pixel configuration including a first pixel group formed by pixels with polarization characteristics and a second pixel group formed by pixels having a polarization direction different from the polarization direction of the first pixel group or pixels with no polarization characteristics and the second image is an image generated by the second imaging unit which has a pixel configuration including a third pixel group formed by pixels having a different polarization direction from the polarization direction of the first image at a position corresponding to the first pixel group and a fourth pixel group formed by pixels with the same configuration as the configuration of the second pixel group at a position corresponding to the second pixel group, a polarized image having a plurality of polarization directions is generated by matching phases of an image of the first pixel group in the first image and an image of the third pixel group in the second image based on a parallax amount of the first and second images and the normal-line map is generated based on a polarization state of the polarized image generated.

In a case of an image in which the second and fourth pixel groups have no polarization characteristics, an image of the second pixel group is generated through an interpolation process using an image of the first pixel group, an image of the fourth pixel group is generated through an interpolation process using an image of the third pixel group, and the polarized image is generated using the interpolated images.

Further, a process of unifying the generated depth map and the generated normal-line map is performed, a depth value not indicated in the depth map is calculated from a shape determined based on a depth value indicated in the depth map and the normal-line map, and a depth map with precision equal to or greater than the generated depth map is generated.

The first imaging unit configured to generate the first image and the second imaging unit configured to generate the second image may be provided in an image processing device. Further, one of the first and second imaging units may be provided in an external device and an image generated by an imaging unit provided in the external device may be acquired by an image processing device through communication.

A second aspect of the present technology resides in an image processing method including: a step of generating, by a depth map generation unit, a depth map by performing a matching process using a first image generated by a first imaging unit which has a pixel configuration including pixels having different polarization directions and a second image generated by a second imaging unit which has a different pixel configuration from the pixel configuration of the first imaging unit; a step of generating, by a normal-line map generation unit, a normal-line map based on a polarization state of a polarized image of at least one of the generated first and second images; and a step of performing, by a map unifying unit, a process of unifying the depth map and the normal-line map.

A third aspect of the present technology resides in an imaging device including: a first imaging unit configured to have a pixel configuration including pixels having different polarization directions; a second imaging unit configured to have a different pixel configuration from the pixel configuration of the first imaging unit; and an image processing unit configured to perform image processing using a first image generated by the first imaging unit and a second image generated by the second imaging unit.

A fourth aspect of the present technology resides in an image processing device including: a reception unit configured to receive a first image from an image processing device including a first imaging unit that has a pixel configuration including pixels having different polarization directions and a transmission unit that transmits the first image generated by the first imaging unit; a second imaging unit configured to have a different pixel configuration from the pixel configuration of the first imaging unit; and an image processing unit configured to perform image processing using the first image received by the reception unit and a second image generated by the second imaging unit.

Advantageous Effects of Invention

According to the present technology, a depth map is generated through a matching process using a first image generated by a first imaging unit which has a pixel configuration including pixels having different polarization directions and a second image generated by a second imaging unit which has a different pixel configuration from the pixel configuration of the first imaging unit. A normal-line map is generated based on a polarization state of a polarized image of at least one of the first and second images. Further, a process of unifying the generated depth map and the generated normal-line map is performed. Accordingly, it is possible to acquire an image in which the number of pixels is not reduced while generating the highly precise depth map. The advantageous effects described in the present specification are merely examples and are not limited thereto, and there may be additional advantageous effects.

BRIEF DESCRIPTION OF DRAWINGS

FIG. 10 is a diagram for describing a map unifying process.

FIG. 11 is a diagram exemplifying a pixel configuration of an image sensor included in an imaging unit according to a first modification example.

FIG. 19 is a diagram for describing a phase adjustment process.

DESCRIPTION OF EMBODIMENTS

Hereinafter, embodiments of the present technology will be described. The description will be made in the following order.

1. Image processing device
2. First embodiment
2-1. Configuration and operation in first embodiment
2-2. First modification example of first embodiment
2-3. Second modification example of first embodiment
3. Second embodiment
3-1. Configuration and operation in second embodiment
3-2. First modification example of second embodiment
3-3. Second modification example of second embodiment
4. Third embodiment <1. Image Processing Device>

Figure 1:
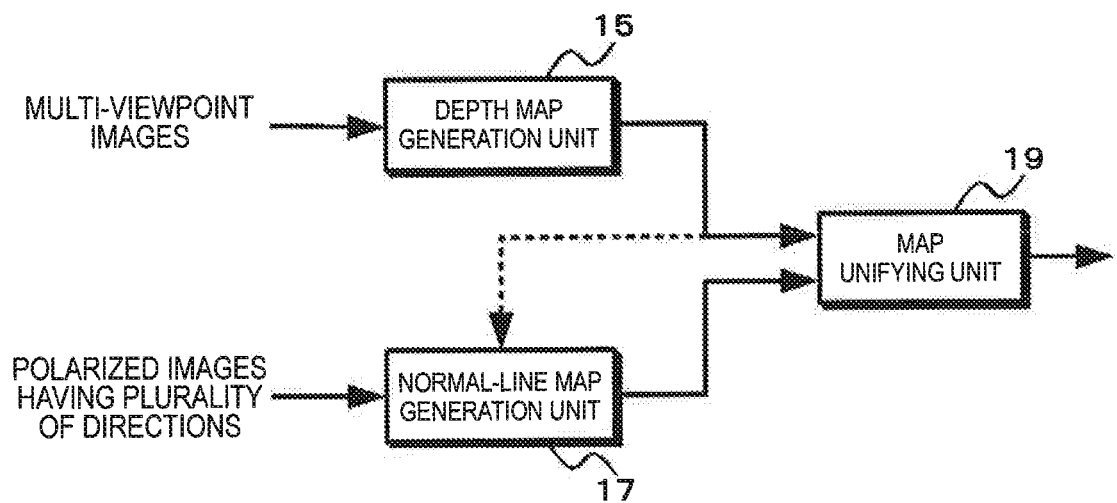
FIG. 1 is a block diagram illustrating a functional configuration of an image processing device.

FIG. 1 is a block diagram illustrating a functional configuration of an image processing device according to the present technology. An image processing device 10 includes a depth map generation unit 15, a normal-line map generation unit 17, and a map unifying unit 19.

The depth map generation unit 15 generates a depth map from multi-viewpoint images. As the multi-viewpoint images, an unpolarized image which is based on a first image generated by a first imaging unit which has a pixel configuration including pixels with different polarization characteristics and an unpolarized image which is based on a second image generated by a second imaging unit which has a different pixel configuration from the pixel configuration of the first imaging unit are used. The depth map generation unit 15 may use a polarized image which is based on the first image and a polarized image which is based on the second image having the same polarization direction as the polarized image. The depth map generation unit 15 generates, for example, a depth map in which a depth value is stored for each pixel by performing a matching process using a right-viewpoint unpolarized image and a left-viewpoint unpolarized image or a right-viewpoint polarized image and a left-viewpoint polarized image having the same polarization direction. The depth map generation unit 15 outputs the generated depth map to the map unifying unit 19.

The normal-line map generation unit 17 generates a normal-line map from polarized images having a plurality of directions. The polarized images having the plurality of directions are polarized images having three or more polarization directions, as will be described below. The normal-line map generation unit 17 uses the first image which is generated by the first imaging unit having a pixel configuration including pixels with different polarization characteristics and includes pixels having three or more polarization directions. The normal-line map generation unit 17 uses the first image which is generated by the first imaging unit having a pixel configuration including pixels with different polarization characteristics and includes pixels having a plurality of polarization directions and the second image which is generated by the second imaging unit having a different pixel configuration from the pixel configuration of the first imaging unit and includes a plurality of pixels having different polarization directions from the polarization direction of the first image. The normal-line map generation unit 17 generates a normal-line map in which normal-line information is stored for each pixel using the polarized image having three or more polarization directions. The normal-line information of the normal-line map is information for which the surface shape of a subject can be acquired by integrating the normal-line information. The surface shape of the subject is a relative value and the normal-line information does not include information regarding a distance to the subject. The normal-line map generation unit 17 outputs the generated normal-line map to the map unifying unit 19. The normal-line map generation unit 17 may generate the normal-line map in which the uncertainty of 180 degrees is solved, as will be described below, by using the depth map generated by the depth map generation unit 15.

The map unifying unit 19 performs a process of unifying the depth map generated by the depth map generation unit 15 and the normal-line map generated by the normal-line map generation unit 17 to generate a depth map with precision equal to or greater than the depth map generated by the depth map generation unit 15. For example, when a depth value is not acquired in the depth map, the map unifying unit 19 determines the surface shape of a subject corresponding to an unacquired depth region using the normal-line map. The map unifying unit 19 generates the depth map with precision equal to or greater than the depth map generated by the depth map generation unit 15 by estimating a depth value of the unacquired depth region based on the determined surface shape and the acquired depth value.

<2. First Embodiment>

Next, a first embodiment of the image processing device will be described. In the first embodiment, a case in which the first imaging unit has a pixel configuration including pixels with different polarization characteristics and the second imaging unit has a different pixel configuration from the pixel configuration of the first imaging unit and includes pixels with no polarization characteristics will be described.

<2-1. Configuration and Operation in First Embodiment>

Figure 2:
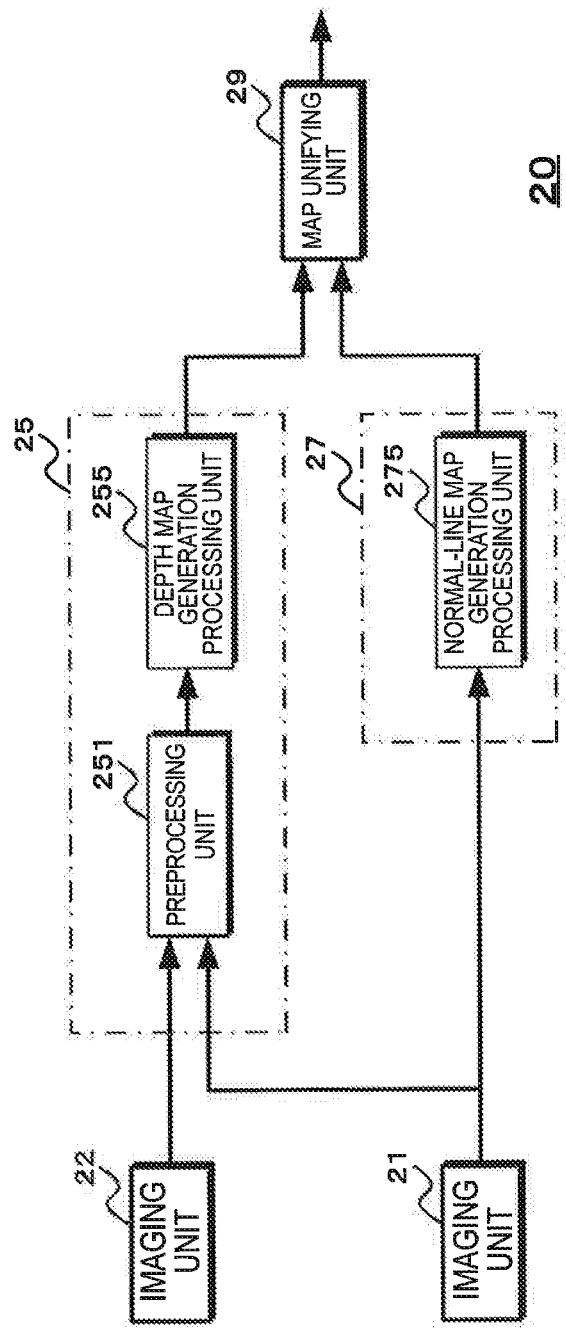
FIG. 2 is a diagram exemplifying a configuration according to a first embodiment.

FIG. 2 exemplifies a configuration according to a first embodiment. An image processing device 20 includes imaging units 21 and 22, a depth map generation unit 25, a normal-line map generation unit 27, and a map unifying unit 29. The imaging units 21 and 22 correspond to stereo cameras and may be provided separately from the image processing device 20.

The imaging unit 21 corresponds to the first imaging unit which has a pixel configuration including pixels with different polarization characteristics. The imaging unit 22 corresponds to the second imaging unit which has a pixel configuration with no polarization characteristics.

Figure 3:
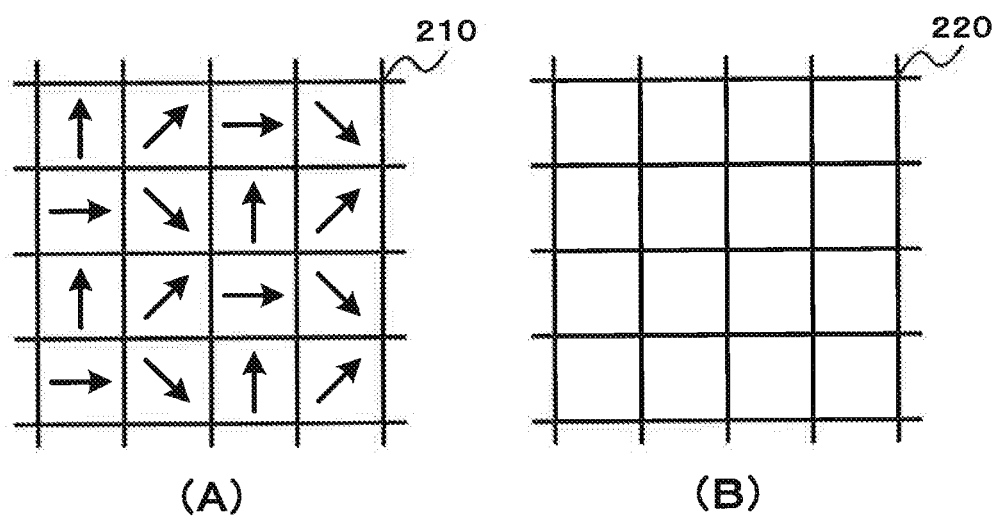
FIG. 3 is a diagram exemplifying a pixel configuration of an image sensor included in an imaging unit.

FIG. 3 exemplifies a pixel configuration of an image sensor included in an imaging unit. FIG. 3 illustrates a part of the image sensor. FIG. 3(A) illustrates the pixel configuration of an image sensor 210 included in the imaging unit 21 and FIG. 3(B) illustrates the pixel configuration of an image sensor 220 included in the imaging unit 22.

The image sensor 210 of the imaging unit 21 is configured such that a polarization filter is disposed in each pixel. For example, as illustrated in FIG. 3(A), polarization directions (the polarization directions are indicated by arrows) are considered to be four directions in the polarization filters of the image sensor 210, and thus a polarized image having four directions is obtained in the imaging unit 21. The imaging unit 21 outputs the generated polarized image to the depth map generation unit 25 and the normal-line map generation unit 27.

The image sensor 220 of the imaging unit 22 is configured to include pixels of a single color (for example, white) in which no polarization filter is disposed. For example, as illustrated in FIG. 3(B), no polarization filter is disposed in the image sensor 220 and an unpolarized image is obtained in the imaging unit 22. The imaging unit 22 outputs the generated unpolarized image to the depth map generation unit 25.

The depth map generation unit 25 includes a preprocessing unit 251 and a depth map generation processing unit 255.

The preprocessing unit 251 generates matching images to be used in a matching process from the polarized image supplied from the imaging unit 21 and the unpolarized image supplied from the imaging unit 22. As described above, since the image supplied from the imaging unit 21 is a polarized image passing through the polarization filters, the image has lower luminance than the unpolarized image generated by the imaging unit 22 using the image sensor in which no polarization filter is disposed. Accordingly, the preprocessing unit 251 generates the matching images so that the matching process corresponding to a difference in a luminance level can be performed. The preprocessing unit 251 performs a filtering process on the polarized image supplied from the imaging unit 21 to generate an unpolarized image. The preprocessing unit 251 performs, for example, an average filtering process of 2 pixels×2 pixels and calculates an average value of pixel values in four polarization directions to generate a pixel value of the unpolarized image.

Next, the preprocessing unit 251 performs an edge extraction process on the unpolarized image obtained by performing the filtering process on the polarized image supplied from the imaging unit 21 and the unpolarized image supplied from the imaging unit 22 to generate edge-extracted images. The preprocessing unit 251 outputs the generated edge-extracted images as matching images to the depth map generation processing unit 255. In this way, since the preprocessing unit 251 uses the edge-extracted images as the matching images, the matching process can be performed by the depth map generation processing unit 255 without an influence of a difference in the luminance level.

Figure 4:
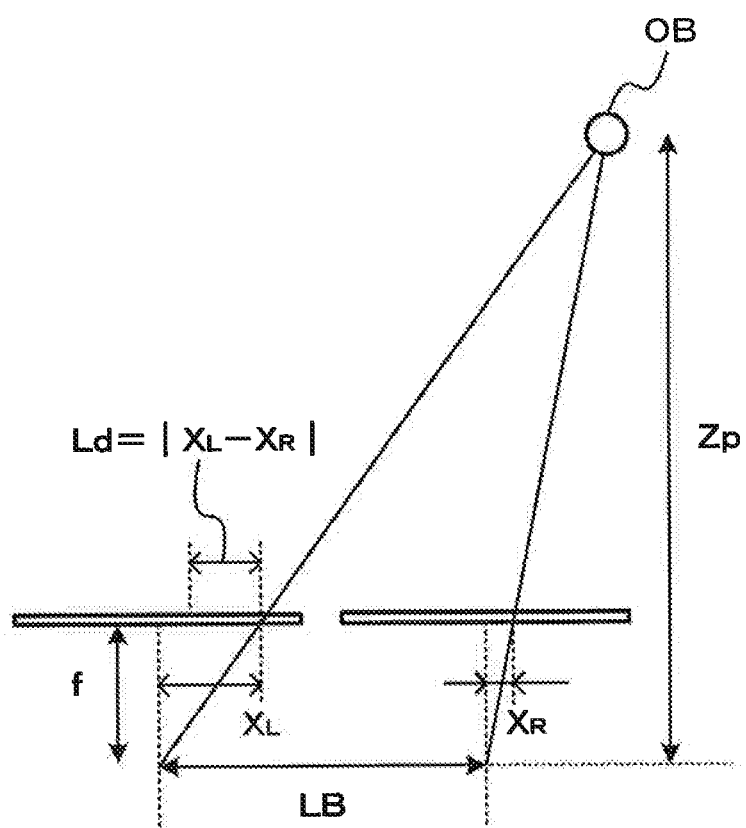
FIG. 4 is a diagram for describing calculation of a distance to a subject.

The depth map generation processing unit 255 performs the matching process using the matching images to generate a depth map. As a matching scheme, any scheme such as region base matching or feature base matching template matching may be used. The depth map generation processing unit 255 performs the matching process to calculate a distance to a subject at each pixel position (hereinafter referred to as a "depth value") based on a deviation amount of a corresponding pixel position. FIG. 4 is a diagram for describing calculation of a distance to a subject. FIG. 4 exemplifies a case in which the imaging units 21 and 22 are disposed right and left at the same posture. Here, the left imaging unit is assumed to be a standard imaging unit and the right imaging unit is assumed to be a reference imaging unit. "LB" is assumed to be an interval (base length) of the standard position of the imaging unit and "f" is assumed to be a focal distance of the imaging unit. In this case, when a position $X_R$ of a subject in the reference imaging unit is deviated by "Ld" from a position $X_L$ of the subject in the standard imaging unit, a distance "Zp" to the subject can be calculated based on expression (1).

[Math. 1]

$$Zp = \frac{LB \times f}{Ld} \quad (1)$$

The depth map generation processing unit 255 generates a depth map by associating the calculated distance (depth value) with a pixel of a captured image. The depth map generation processing unit 255 outputs the generated depth map to the map unifying unit 29.

Figure 5:
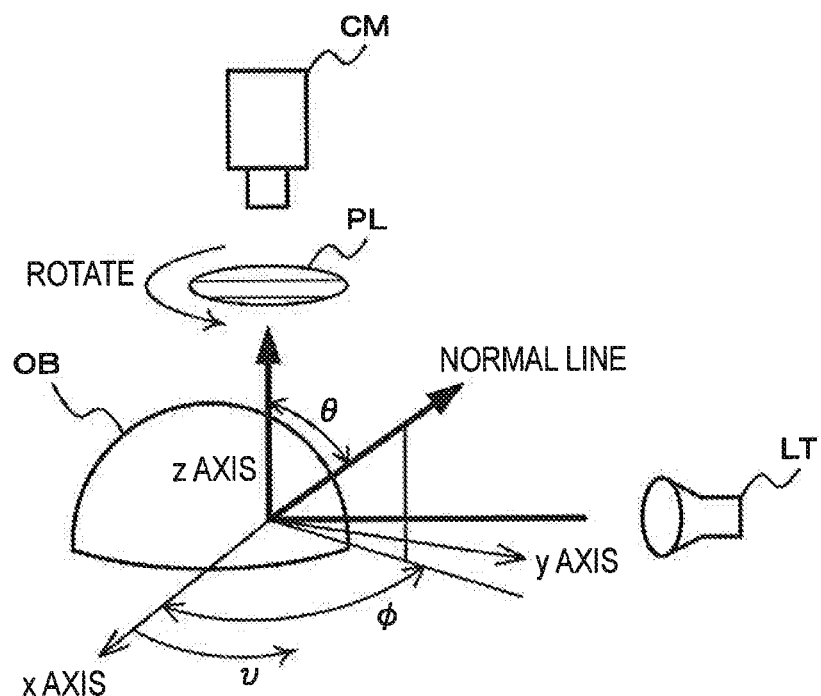
FIG. 5 is a diagram for describing a polarized-image generation operation.
Figure 6:
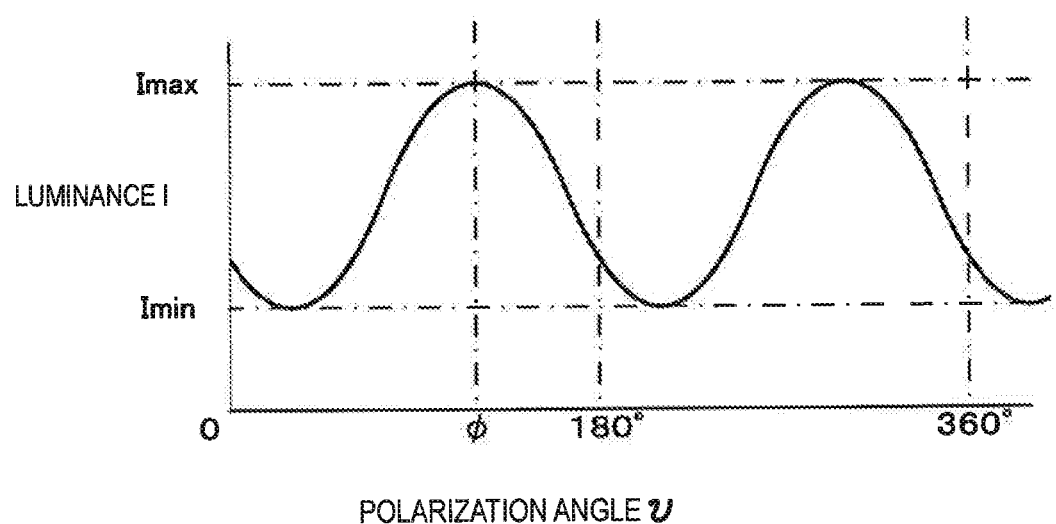
FIG. 6 is a diagram exemplifying a relation between luminance and a polarization angle.

The normal-line map generation unit 27 includes a normal-line map generation processing unit 275. The normal-line map generation processing unit 275 generates a normal-line map based on the polarized image having the plurality of polarization directions and supplied from the imaging unit 21. FIG. 5 is a diagram for describing a polarized-image generation operation. As illustrated in FIG. 5, a subject OB is illuminated using a light source LT and the subject OB is imaged by an imaging unit CM via a polarization plate PL. In this case, for a polarized image generated by the imaging unit CM, the luminance of the subject OB is known to change according to rotation of the polarization plate PL. Here, when the polarization plate PL is rotated, Imax is assumed to be the highest luminance and Imin is assumed to be the lowest luminance. When the x and y axes of the 2-dimensional coordinates are in a planar direction of the polarization plate PL, an angle with respect to the x axis on the xy plane at the time of rotation of the polarization plate PL is assumed to be a polarization angle υ. When the polarization plate PL is rotated by 180 degrees, the polarization plate PL returns to an original polarization state and thus has a period of 180 degrees. In a case of a diffuse reflection model, it is assumed that the polarization angle υ is set to an azimuth angle φ when the maximum luminance Imax is observed. In this definition, a luminance I observed at the time of rotation of the polarization plate PL can be expressed as in expression (2). FIG. 6 exemplifies a relation between luminance and a polarization angle.

[Math. 2]

$$I = \frac{I_{max} + I_{min}}{2} + \frac{I_{max} - I_{min}}{2}\cos(2\upsilon + 2\phi) \quad (2)$$

In expression (2), the polarization angle υ is obvious when the polarized image is generated, and the maximum luminance Imax, the minimum luminance Imin, and an azimuth angle φ are variables. Accordingly, since the variables are three variables, the normal-line map generation processing unit 275 performs fitting to a function expressed in expression (2) using the luminance of the polarized image having three or more polarization directions and determines the azimuth angle φ at which the luminance is the maximum based on a function indicating a relation between the luminance and the polarization angle.

A normal line of an object surface is expressed with a polar coordinate system and normal-line information is assumed to be the azimuth angle φ and a zenith angle θ. The zenith angle θ is assumed to be an angle oriented from the z axis to the normal line and the azimuth angle φ is assumed to be an angle of the y axis direction with respect to the x axis, as described above. Here, even when the minimum luminance Imin and the maximum luminance Imax obtained by rotating the polarization plate PL are used, a polarization degree ρ can be calculated by performing calculation of expression (3).

[Math. 3]

$$\rho = \frac{I_{max} - I_{min}}{I_{max} + I_{min}} \quad (3)$$

Figure 7:
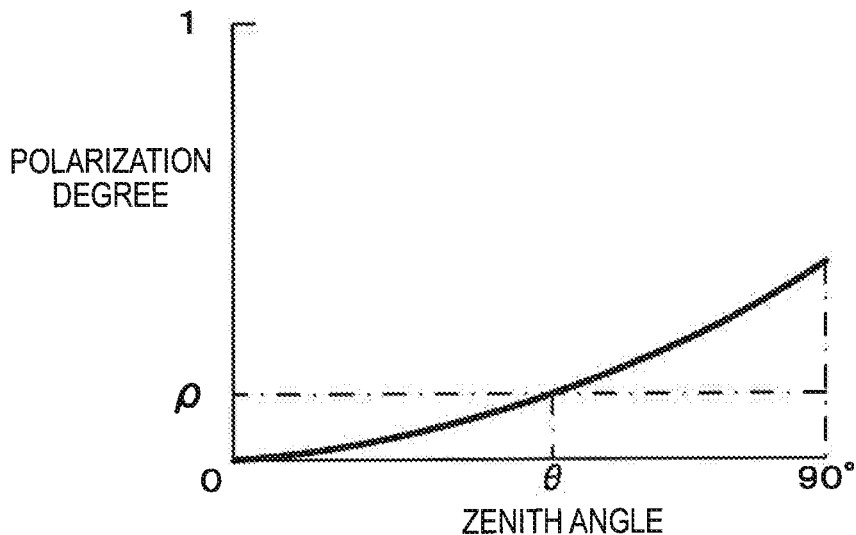
FIG. 7 is a diagram exemplifying a relation between a polarization angle and a zenith angle.

A relation between the polarization degree and the zenith angle is known to have, for example, characteristics illustrated in FIG. 7 from the Frensnel equations. The zenith angle θ can be determined based on the polarization degree ρ from the characteristics illustrated in FIG. 7. The characteristics illustrated in FIG. 7 are exemplary characteristics. The characteristics are changed depending on a refractive index of a subject.

Accordingly, the normal-line map generation processing unit 275 obtains a relation between the luminance and the polarization angle from the polarization direction and the luminance of the polarized image based on the polarized image having three or more polarization directions and determines the azimuth angle φ at which the luminance is the maximum. The normal-line map generation processing unit 275 calculates the polarization degree ρ using the maximum luminance and the minimum luminance obtained from the relation between the luminance and the polarization angle and determines the zenith angle θ corresponding to the calculated polarization degree ρ based on a characteristic curve indicating a relation between the polarization angle and the azimuth angle. In this way, the normal-line map generation processing unit 275 obtains the normal-line information (the azimuth angle φ and the zenith angle θ) regarding the subject based on the polarized image having three or more polarization directions for each pixel position and generates the normal-line map. The normal-line map generation processing unit 275 outputs the generated normal-line map to the map unifying unit 29.

The map unifying unit 29 performs a process of unifying the depth map and the normal-line map. The map unifying unit 29 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 29 generates the depth map with precision equal to or greater than the depth map supplied from the depth map generation unit 25 by including the estimated depth value in the depth map supplied from the depth map generation unit 25.

Figure 8:
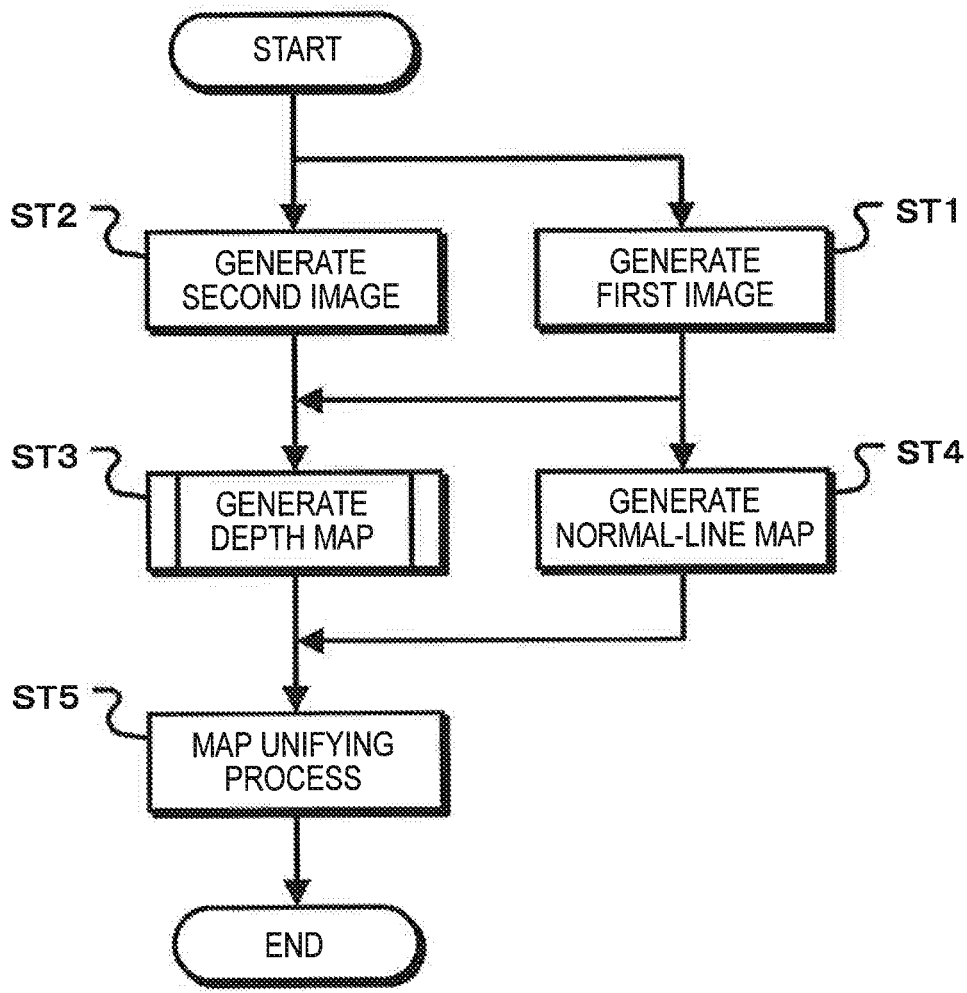
FIG. 8 is a flowchart illustrating a processing operation according to the first embodiment.

FIG. 8 is a flowchart illustrating a processing operation according to the first embodiment. In step ST1, the imaging unit 21 generates the first image. The imaging unit 21 generates the polarized image having the plurality of polarization directions as the first image. In step ST2, the imaging unit 22 generates the second image. The imaging unit 22 generates the unpolarized image as the second image.

Figure 9:
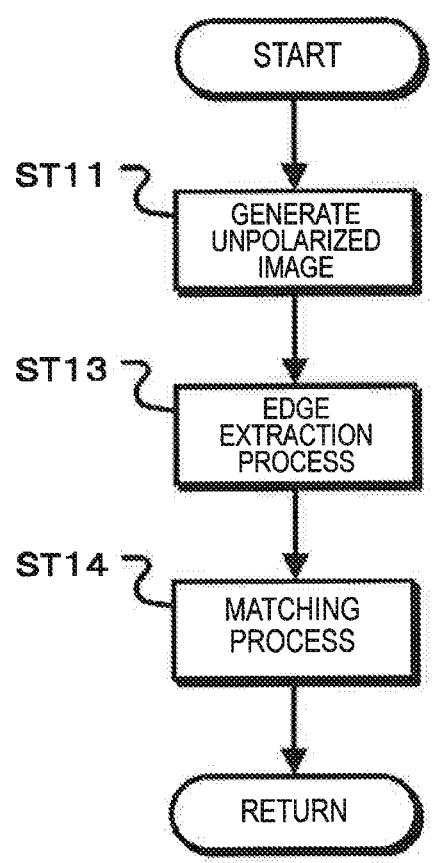
FIG. 9 is a flowchart illustrating a processing operation of a depth map generation unit.

In step ST3, the depth map generation unit 25 generates the depth map. FIG. 9 is a flowchart illustrating a processing operation of a depth map generation unit.

In step ST11, the depth map generation unit 25 generates the unpolarized image. The preprocessing unit 251 of the depth map generation unit 25 performs the average filtering process on the first image, that is, the polarized image having the plurality of polarization directions, to generate the unpolarized image.

In step ST13, the depth map generation unit 25 performs the edge extraction process. The preprocessing unit 251 of the depth map generation unit 25 performs the edge extraction process on the unpolarized image which is the second image and is generated by the imaging unit 22 and the unpolarized image generated in step ST11 to generate the matching images. The depth map generation unit 25 can generate the matching images in which there is no influence of the difference in the luminance level between the first and second images by performing the edge extraction process in this way.

In step ST14, the depth map generation unit 25 performs the matching process. The depth map generation processing unit 255 of the depth map generation unit 25 performs the matching process using the matching image generated from the first image and the matching image generated from the second image. Further, the depth map generation unit 25 generates the depth map indicating the depth value for each pixel based on the result of the matching process.

In step ST4 of FIG. 8, the normal-line map generation unit 27 generates the normal-line map. The normal-line map generation unit 27 determines the azimuth angle φ and the zenith angle θ for each pixel using the first image and generates the normal-line map.

In step ST5, the map unifying unit 29 performs the map unifying process. The map unifying unit 29 estimates the depth value corresponding to the pixel in which the depth value is not obtained by tracking the surface shape of the subject using the pixel in which the depth value is obtained as a starting point based on the depth value indicated in the depth map and the surface shape of the subject indicated in the normal-line map. The map unifying unit 29 includes the estimated depth value in the depth map.

FIG. 10 is a diagram for describing the map unifying process. To facilitate the description, for example, a unifying process for one line will be described. As illustrated in FIG. 10(A), the imaging units 21 and 22 image a subject OB, a depth map illustrated in FIG. 10(B) is assumed to be obtained by the depth map generation unit 25, and a normal-line map illustrated in FIG. 10(C) is assumed to be obtained by the normal-line map generation unit 27. In the depth map, for example, it is assumed that the depth value of a pixel at the left end is "2 (meters)" and depth values are not stored in other pixels indicated by "x." The map unifying unit 29 estimates the surface shape of the subject OB based on the normal-line map. Here, the second pixel from the left end can be determined to correspond to an inclined surface which approaches the subject surface corresponding to the pixel at the left end based on the not normal-line direction of the second pixel in the directions of the imaging units 21 and 22. Accordingly, the map unifying unit 29 estimates the depth value of the second pixel from the left end by tracking the surface shape of the subject OB using the pixel at the left end as a starting point and sets the depth value to, for example, "1.5 (meters)." The map unifying unit 29 stores the estimated depth value in the depth map. The third pixel from the left end can be determined to correspond to an opposite surface to the imaging units 21 and 22 based on the normal-line direction of the third pixel. Accordingly, the map unifying unit 29 estimates the depth value of the third pixel from the left end by tracking the surface shape of the subject OB using the pixel at the left end as a starting point and sets the depth value to, for example, "1 (meter)." The map unifying unit 29 stores the estimated depth value in the depth map. The fourth pixel from the left end can be determined to correspond to an inclined surface which recedes from the subject surface corresponding to the third pixel from the left end in the directions of the imaging units 21 and 22. Accordingly, the map unifying unit 29 estimates the depth value of the fourth pixel from the left end by tracking the surface shape of the subject OB using the pixel at the left end as a starting point and sets the depth value to, for example, "1.5 (meters)." The map unifying unit 29 stores the estimated depth value in the depth map. Similarly, the map unifying unit 29 estimates the depth value of the fifth pixel from the left end and stores the depth value as, for example, "2 (meters)" in the depth map.

In this way, the map unifying unit 29 estimates the depth value by performing the process of unifying the depth map and the normal-line map and tracking the surface shape based on the normal-line map using the depth value in the depth map as a starting point. Accordingly, even when some of the depth values are absent in the depth map illustrated in FIG. 10(B) generated by the depth map generation unit 25, the map unifying unit 29 can compensate for the absent depth values. Accordingly, it is possible to generate the depth map illustrated in FIG. 10(D) with precision equal to or higher than the depth map illustrated in FIG. 10(B).

As described above, according to the first embodiment, even in a subject region in which it is difficult to acquire the depth value in the matching process, the depth value can be estimated using the normal-line map generated based on the polarized image having the plurality of polarization directions. Accordingly, it is possible to generate the highly precise depth map with the precision equal to or greater than the depth map generated by the depth map generation unit 25, that is, the depth map in which the depth value is stored for each pixel of the subject region. Since the highly precise depth map can be generated without performing a process in which four pixels are set as units of images, it is possible to acquire an image in which the number of pixels is not reduced while generating the highly precise depth map.

<2-2. First Modification Example of First Embodiment>

In the above-described embodiment, the configuration in which the image sensor configured with the pixels of the single color is used in the imaging unit has been exemplified, but a configuration in which an image sensor configured to include pixels of a plurality of colors may be used. Next, a case in which an image sensor including red, blue, and green pixels formed in a Bayer array is used in the imaging unit 22 will be described according to a first modification example of the first embodiment. The configuration of the image processing device is assumed to have the same configuration as that of FIG. 2.

FIG. 11 is a diagram exemplifying a pixel configuration of an image sensor included in an imaging unit according to the first modification example. FIG. 11 illustrates a part of the image sensor. FIG. 11(A) illustrates the pixel configuration of the image sensor 210 included in the imaging unit 21 and FIG. 11(B) illustrates the pixel configuration of an image sensor 221 included in the imaging unit 22. "R" indicates a red pixel, "G" indicates a green pixel, and "B" indicates a blue pixel.

The image sensor 210 of the imaging unit 21 is configured such that a polarization filter is disposed in each pixel. For example, as illustrated in FIG. 3(A), polarization directions (the polarization directions are indicated by arrows) are considered to be four directions in the polarization filters of the image sensor 210, and thus a polarized image having four directions is obtained in the imaging unit 21. The imaging unit 21 outputs the generated polarized image to the depth map generation unit 25 and the normal-line map generation unit 27.

In the image sensor 221 of the imaging unit 22, for example, as illustrated in FIG. 11(B), no polarization filter is disposed and pixels of the three primary colors (R, G, and B) are configured in a Bayer array. An unpolarized image is obtained in the imaging unit 22. The imaging unit 22 outputs the generated unpolarized image to the depth map generation unit 25.

The depth map generation unit 25 includes a preprocessing unit 251 and a depth map generation processing unit 255.

The preprocessing unit 251 generates matching images to be used in a matching process from the polarized image supplied from the imaging unit 21 and the unpolarized image supplied from the imaging unit 22. As described above, since the image supplied from the imaging unit 21 is a polarized image passing through the polarization filters, the image has lower luminance than the unpolarized image generated by the imaging unit 22 using the image sensor in which no polarization filter is disposed. Accordingly, the preprocessing unit 251 generates the matching images so that the matching process corresponding to a difference in a luminance level can be performed. The preprocessing unit 251 performs a filtering process on the polarized image supplied from the imaging unit 21 to generate an unpolarized image. The preprocessing unit 251 performs, for example, an average filtering process of 2 pixels×2 pixels and calculates an average value of pixel values in four polarization directions to generate a pixel value of the unpolarized image.

Next, the preprocessing unit 251 performs demosaic processing to generate a luminance image since the image sensor 221 used in the imaging unit 22 is configured such that the pixels of the three primary pixels have the Bayer array. The preprocessing unit 251 performs an edge extraction process on the luminance image obtained by performing the demosaic processing on the unpolarized image supplied from the imaging unit 21 and subjected to the filtering process and the unpolarized image supplied from the imaging unit 22 to generate edge-extracted images. The preprocessing unit 251 outputs the generated edge-extracted images as matching images to the depth map generation processing unit 255. In this way, since the preprocessing unit 251 uses the edge-extracted images as the matching images, the matching process can be performed by the depth map generation processing unit 255 without an influence of a difference in the luminance level.

The depth map generation processing unit 255 performs the matching process using the matching images, as described above, to generate a depth map. The normal-line map generation unit 27 generates a normal-line map based on the polarized image having the plurality of polarization directions and supplied from the imaging unit 21, as described above.

The map unifying unit 29 performs a process of unifying the depth map and the normal-line map. The map unifying unit 29 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 29 generates the depth map with precision equal to or greater than the depth map supplied from the depth map generation unit 25 by including the estimated depth value in the depth map supplied from the depth map generation unit 25.

Figure 12:
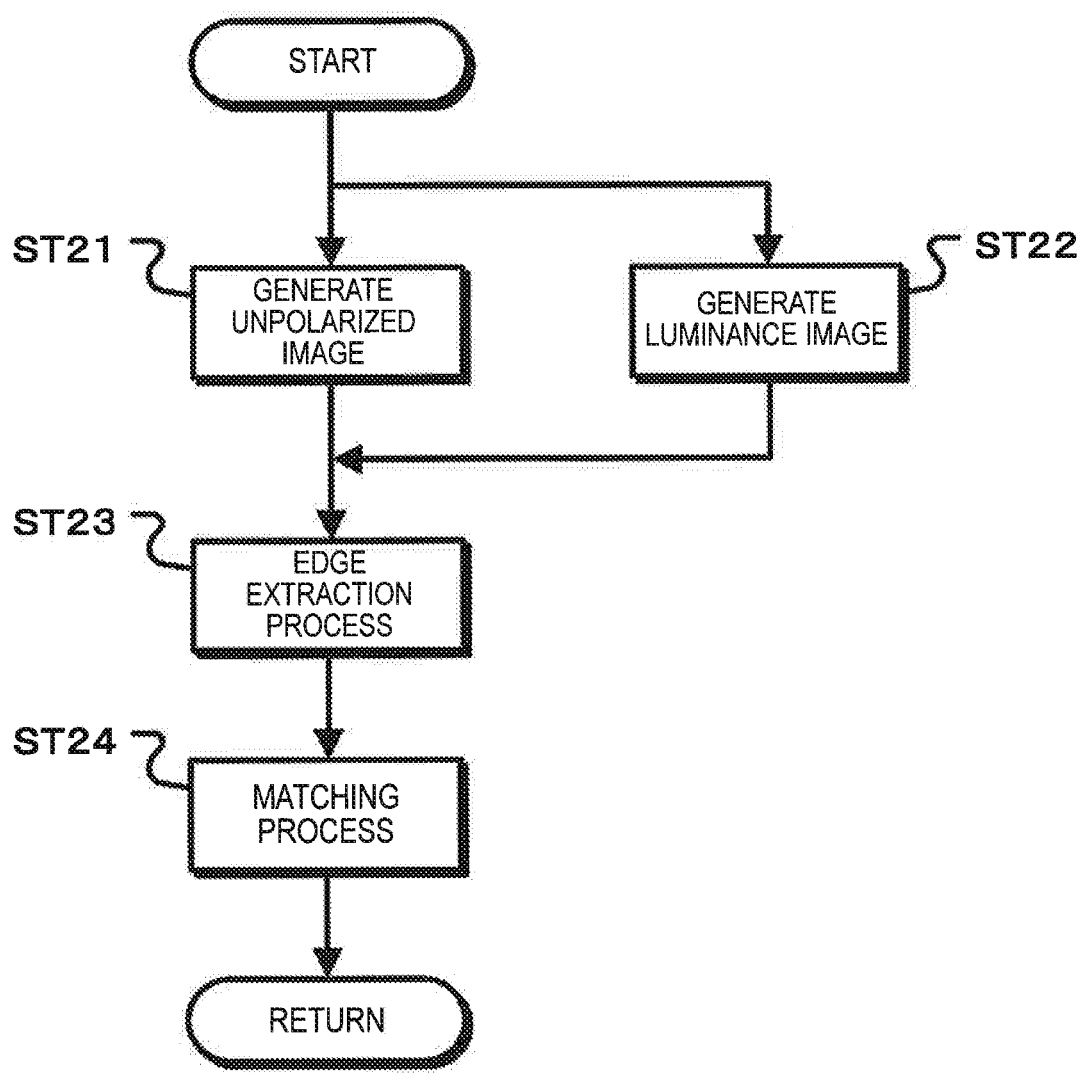
FIG. 12 is a flowchart illustrating a processing operation of a depth map generation unit according to the first modification example.

FIG. 12 is a flowchart illustrating a processing operation of the depth map generation unit according to the first modification example. In step ST21, the depth map generation unit 25 generates the unpolarized image. The preprocessing unit 251 of the depth map generation unit 25 performs the average filtering process on the first image, that is, the polarized image having the plurality of polarization directions, to generate the unpolarized image.

In step ST22, the depth map generation unit 25 generates the luminance image. The preprocessing unit 251 of the depth map generation unit 25 performs the demosaic processing on the unpolarized image of the three primary colors which is the second image and is generated by the imaging unit 22 to generate a luminance image.

In step ST23, the depth map generation unit 25 performs the edge extraction process. The preprocessing unit 251 of the depth map generation unit 25 performs the edge extraction process on the unpolarized image generated in step ST21 and the luminance image which is generated in step ST22 to generate the matching images. The depth map generation unit 25 can generate the matching images in which there is no influence of the difference in the luminance level between the first and second images by performing the edge extraction process in this way.

In step ST24, the depth map generation unit 25 performs the matching process. The depth map generation processing unit 255 of the depth map generation unit 25 performs the matching process using the matching image generated from the first image and the matching image generated from the second image. Further, the depth map generation unit 25 generates the depth map indicating the depth value based on the result of the matching process.

When such processes are performed, the highly precise depth map can be generated even when the image sensor configured such that the pixels of the three primary colors (R, G, and B) have the Bayer array is used in the imaging unit 22.

<2-3. Second Modification Example of First Embodiment>

The normal-line map generation unit 27 according to the above-described embodiment generates a normal-line map using a polarized image having a plurality of polarization directions. As described above, when the polarization plate PL is rotated by 180 degrees, the polarization state returns to the original polarization state and a luminance change has the period of 180 degrees. Thus, the polarization plate PL is known to have the so-called uncertainty of 180 degrees. Accordingly, in the second modification example, a case in which the uncertainty of 180 degrees is eliminated using a depth map will be described.

Figure 13:
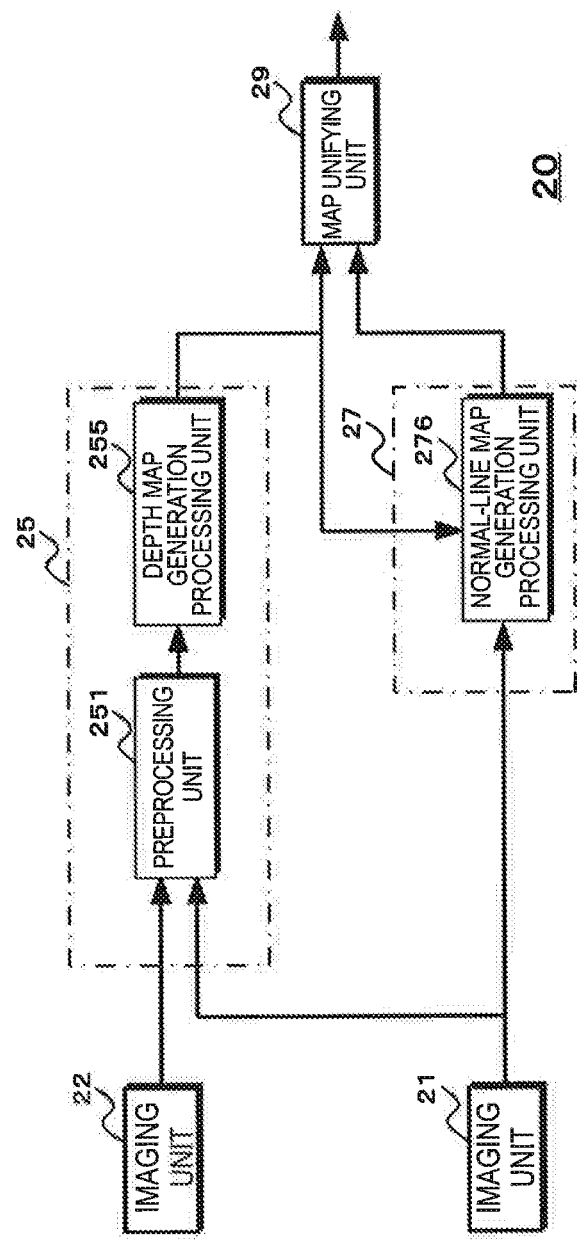
FIG. 13 is a diagram exemplifying a configuration according to a second modification example.

FIG. 13 is a diagram exemplifying a configuration according to a second modification example. An image processing device 20 includes imaging units 21 and 22, a depth map generation unit 25, a normal-line map generation unit 27, and a map unifying unit 29. The imaging units 21 and 22 correspond to stereo cameras and may be provided separately from the image processing device 20.

The imaging unit 21 corresponds to the first imaging unit which has a pixel configuration including pixels with different polarization characteristics. The imaging unit 22 corresponds to the second imaging unit which has a pixel configuration including pixels with no polarization characteristics. The imaging unit 21 uses, for example, the image sensor which has the configuration illustrated in FIG. 3(A) or FIG. 11(A). The imaging unit 22 uses, for example, the image sensor which has the configuration illustrated in FIG. 3(B) or FIG. 11(B).

The depth map generation unit 25 includes a preprocessing unit 251 and a depth map generation processing unit 255. The preprocessing unit 251 generates matching images to be used in a matching process, as described above, from the polarized image supplied from the imaging unit 21 and the unpolarized image supplied from the imaging unit 22. The depth map generation processing unit 255 performs the matching process using the matching images to generate a depth map. The depth map generation processing unit 255 outputs the generated depth map to the normal-line map generation unit 27 and the map unifying unit 29.

The normal-line map generation unit 27 includes a normal-line map generation processing unit 276. The normal-line map generation processing unit 276 performs the same process as the normal-line map generation processing unit 275 to generate a normal-line map based on the polarized image having the plurality of polarization directions and supplied from the imaging unit 21. The normal-line map generation processing unit 276 determines a gradient direction of a subject based on the depth map and generates a normal-line map to eliminate the uncertainty of 180 degrees.

Figure 14:
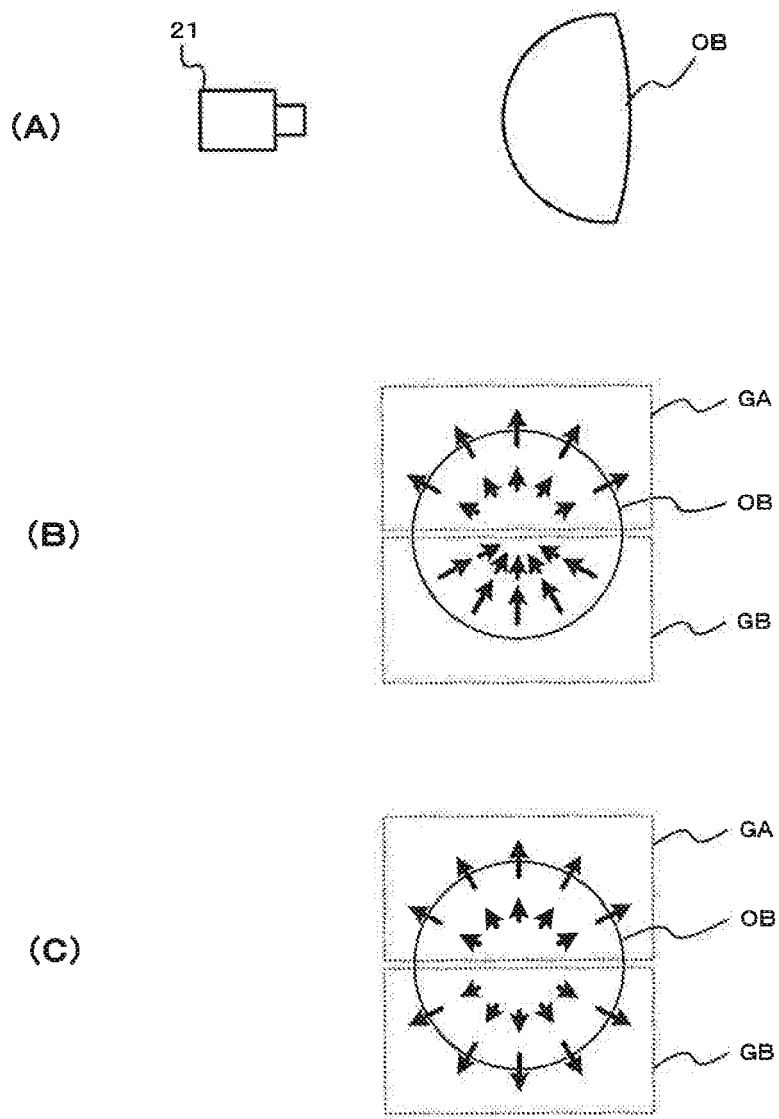
FIG. 14 is a diagram for describing an operation of a normal-line map generation processing unit.

FIG. 14 is a diagram for describing an operation of the normal-line map generation processing unit. When a subject GB illustrated in FIG. 14(A) is imaged by the imaging unit 21 and a normal-line map is generated, a luminance change according to rotation in a polarization direction has a period of 180 degrees. Accordingly, as illustrated in FIG. 14(B), for example, normal-line directions (indicated by arrows) are right directions in a region GA of the upper half of the subject OB. In a region GB of the lower half, there is a concern about the normal-line directions being opposite directions. Here, when the normal-line map generation processing unit 276 determines the gradient direction of the subject GB based on the depth map, the normal-line map generation processing unit 276 can determine that the subject OB with a shape projecting in the direction of the imaging unit 21. Since the subject OB has the shape projecting in the direction of the imaging unit 21, the normal-line map generation processing unit 276 can determine that the normal-line directions of the region GB of the lower half illustrated in FIG. 14(B) are the opposite directions. Accordingly, the normal-line map generation processing unit 276 can generate a right normal-line map from which the uncertainty of 180 degrees is eliminated, as illustrated in FIG. 14(C), by causing the normal-line directions of the region GB of the lower half to be the opposite directions.

The map unifying unit 29 performs a process of unifying the depth map and the normal-line map. The map unifying unit 29 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 29 generates the depth map with precision equal to or greater than the depth map supplied from the depth map generation unit 25 by including the estimated depth value in the depth map supplied from the depth map generation unit 25.

Figure 15:
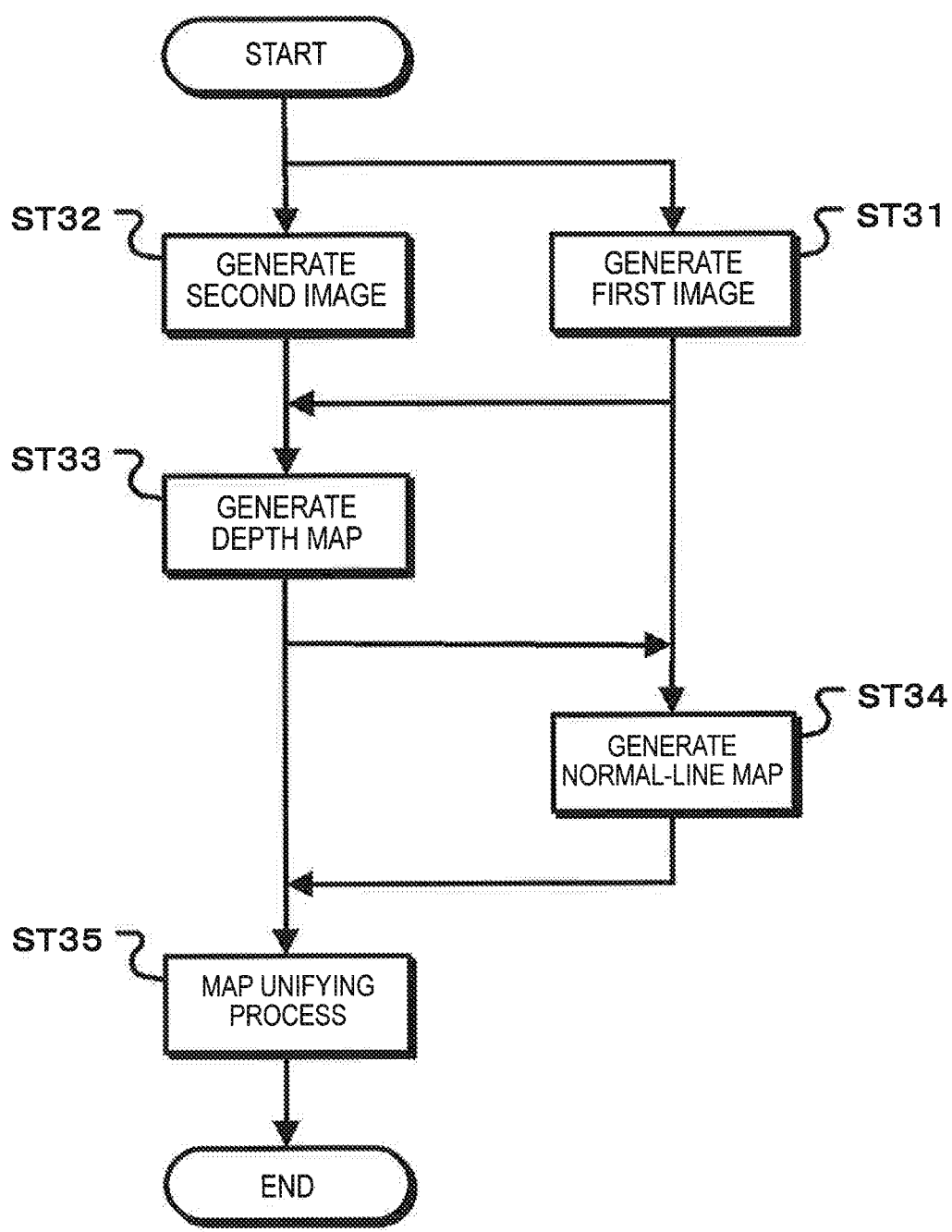
FIG. 15 is a flowchart illustrating a processing operation according to the second modification example.

FIG. 15 is a flowchart illustrating a processing operation according to the second modification example. In step ST31, the imaging unit 21 generates the first image. The imaging unit 21 generates the polarized image having the plurality of polarization directions as the first image. In step ST32, the imaging unit 22 generates the second image. The imaging unit 22 generates the unpolarized image as the second image.

In step ST33, the depth map generation unit 25 generates the depth map. The depth map generation unit 25 generates the unpolarized images and generates the matching images based on the unpolarized images. The depth map generation unit 25 performs the matching process using the matching images and generates the depth map indicating the depth value based on the result of the matching process.

In step ST34, the normal-line map generation unit 27 generates the normal-line map. The normal-line map generation unit 27 generates the normal-line map from which the uncertainty of 180 degrees is eliminated based on the first image and the depth map.

In step ST35, the may unifying unit 29 performs the map unifying process. The map unifying unit 29 estimates the depth value corresponding to the pixel in which the depth value is not obtained by tracking the surface shape of the subject using the pixel in which the depth value is obtained as a starting point based on the depth value indicated in the depth map and the surface shape of the subject indicated in the normal-line map. The map unifying unit 29 includes the estimated depth value in the depth map.

In this way, according to the second modification example, the right normal-line map can be generated by eliminating the uncertainty of 180 degrees, and thus it is possible to correctly generate the highly precise depth map. In the second modification example, the normal-line map generation processing unit 276 generates the right normal-line map and outputs the right normal-line map to the map unifying unit 29. However, the map unifying unit 29 may eliminate the uncertainty of 180 degrees. For example, the map unifying unit 29 may determine the gradient direction of the subject based on the depth map, correct the normal-line directions of the normal-line map generated by the above-described normal-line map generation processing unit 275 to the right directions based on the determination result, and then perform the map unifying process.

<3. Second Embodiment>

Next, a second embodiment of the image processing device will be described. In the second embodiment, a first image is assumed to be an image generated by a first imaging unit which has a pixel configuration including a first pixel group formed by pixels with polarization characteristics and a second pixel group formed by pixels having different polarization directions from the polarization direction of the first pixel group or pixels with no polarization characteristics. A second image is assumed to be an image generated by a second imaging unit which has a pixel configuration including a third pixel group formed by pixels of which a polarization direction is different from the polarization direction of the first image at a position corresponding to the first pixel group and a fourth pixel group formed by pixels with the same configuration as the configuration of the second pixel group at a position corresponding to the second pixel group. In the second embodiment, a depth map is generated by performing a matching process between images having the same polarization direction or images with no polarization characteristics by using an image of the second pixel group in the first image and an image of the fourth pixel group in the second image. Further, in a case of an image in which the second and fourth pixel groups have no polarization characteristics, a normal-line map is generated as a polarized image of the first and third pixel groups which has three or more polarization directions in total.

<3-1. Configuration and Operation in Second Embodiment>

Figure 16:
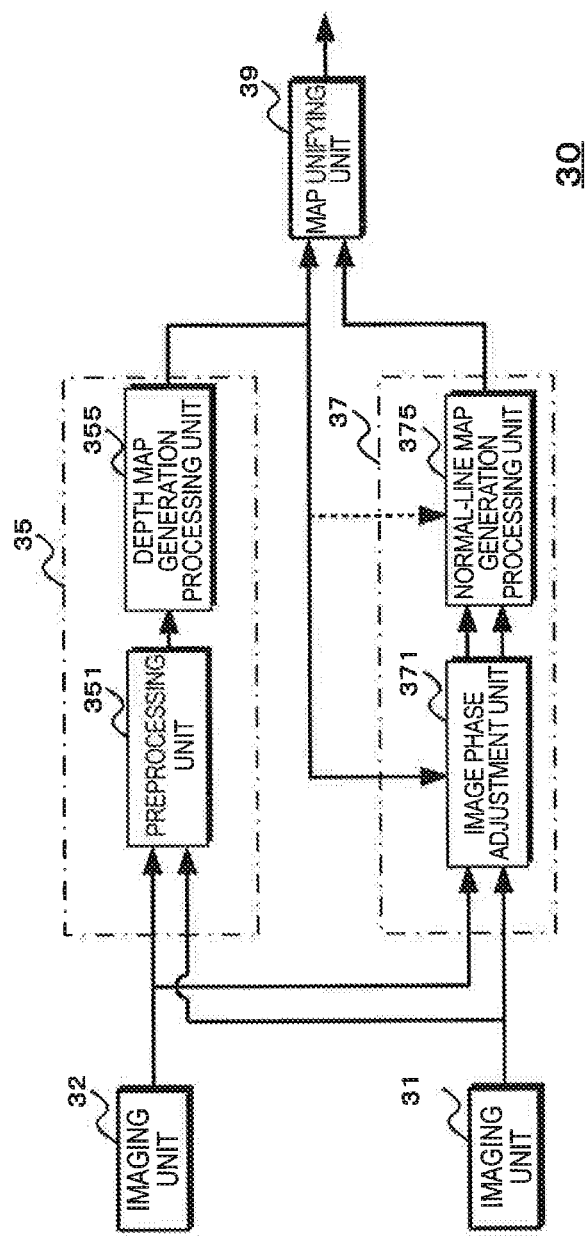
FIG. 16 is a diagram exemplifying a configuration according to a second embodiment.

FIG. 16 is a diagram exemplifying a configuration according to the second embodiment. An image processing device 30 includes imaging units 31 and 32, a depth map generation unit 35, a normal-line map generation unit 37, and a map unifying unit 39. The imaging units 31 and 32 correspond to stereo cameras and may be provided separately from the image processing device 30.

The imaging unit 31 corresponds to a first imaging unit which has a pixel configuration including the first pixel group formed by the pixels with polarization characteristics and the second pixel group formed by the pixels having the different polarization direction from the polarization direction of the first pixel group or the pixels with no polarization characteristics. The imaging unit 32 corresponds to a second imaging unit which has a pixel configuration including the third pixel group formed by the pixels having the different polarization direction from the polarization direction of the first image at the position corresponding to the first pixel group and the fourth pixel group formed by the pixels with the same configuration as the configuration of the second pixel group at the position corresponding to the second pixel group.

Figure 17:
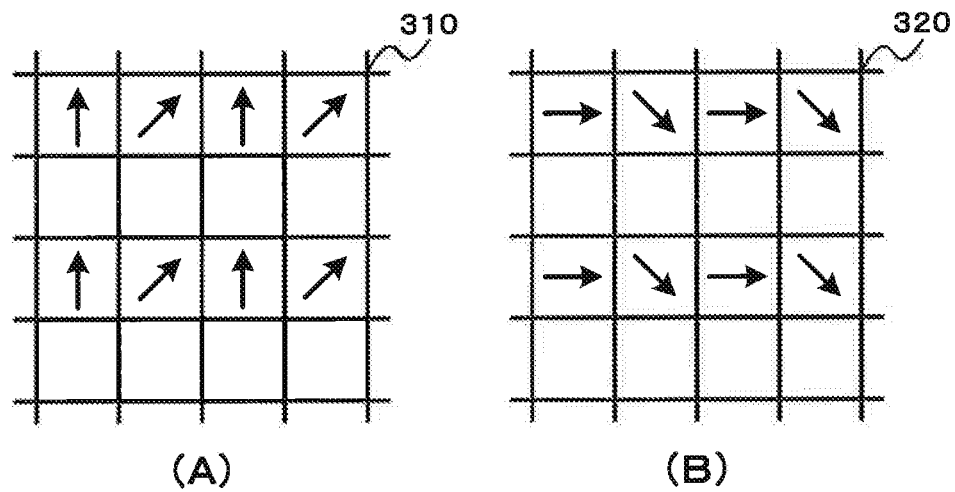
FIG. 17 is a diagram exemplifying a pixel configuration of an image sensor included in an imaging unit.

FIG. 17 exemplifies a pixel configuration of an image sensor included in an imaging unit. FIG. 17 illustrates a part of the image sensor. FIG. 17(A) illustrates the pixel configuration of an image sensor 310 included in the imaging unit 31 and FIG. 17(B) illustrates the pixel configuration of an image sensor 320 included in the imaging unit 32.

The image sensor 310 of the imaging unit 31 is configured such that unpolarized pixels and pixels provided with polarization filters having a plurality of polarization directions coexist. For example, as illustrated in FIG. 17(A), lines of the unpolarized pixels are provided every other line in the image sensor 310. In lines in which the polarization filters are provided, the pixels having two different polarization directions (the polarization directions are indicated by arrows) are alternately provided. Accordingly, in the imaging unit 31, an image formed by the pixels which have two polarization directions and are the first pixel group and the unpolarized pixels which are the second pixel group is obtained. The imaging unit 31 outputs the generated image to the depth map generation unit 35 and the normal-line map generation unit 37.

The image sensor 320 of the imaging unit 32 is configured such that unpolarized pixels and pixels provided with polarization filters having a plurality of polarization directions coexist. For example, as illustrated in FIG. 17(B), lines of the unpolarized pixels are provided in the image sensor 320, as in the image sensor 310. In lines in which the polarization filters are provided, the pixels having two different kinds of polarization directions (the polarization directions are indicated by arrows) from that of the image sensor 310 of the imaging unit 31 are alternately provided. Accordingly, in the imaging unit 32, an image formed by the pixels of the third pixel group having two different polarization directions from the polarization direction of the imaging unit 31 and the unpolarized pixels which are the fourth pixel group is obtained. The imaging unit 32 outputs the generated image to the depth map generation unit 35 and the map generation unit 37. That is, in the case of FIG. 17, the polarized image having four polarization directions is output to the normal-line map generation unit 37.

The depth map generation unit 35 includes a preprocessing unit 351 and a depth map generation processing unit 355.

The preprocessing unit 351 extracts images of unpolarized portions from the images supplied from the imaging units 31 and 32 and outputs the extracted images as matching images to be used in a matching process to the depth map generation processing unit 355.

The depth map generation processing unit 355 performs the matching process using the matching images to generate a depth map. The depth map generation processing unit 355 performs the matching process as in the above-described depth map generation processing unit 255 and calculates a distance (depth value) to a subject at each pixel position based on a deviation amount at a corresponding pixel position. The depth map generation processing unit 355 performs a depth interpolation process on a pixel of the unpolarized portion using the calculated depth value and calculates the depth value of a pixel provided with the polarization fitter. The depth map generation processing unit 355 generates the depth map by associating the depth value with the pixel of a captured image. The depth map generation processing unit 355 generates the depth map by associating the calculated depth value with the pixel of the captured image. The depth map generation processing unit 355 outputs the generated depth map to the normal-line map generation unit 37 and the map unifying unit 39.

The normal-line map generation unit 37 includes an image phase adjustment unit 371 and a normal-line map generation processing unit 375.

The image phase adjustment unit 371 converts the depth map output from the depth map generation unit 35 into a disparity map. The image phase adjustment unit 371 determines a parallax amount based on the depth value of each pixel indicated in the depth map and generates the disparity map. The deviation amount at the pixel position is calculated for each pixel through the matching process in the depth map generation unit 35. The image phase adjustment unit 371 may acquire the deviation amount for each pixel from the depth map generation unit 35 and generate the disparity map.

Figure 18:
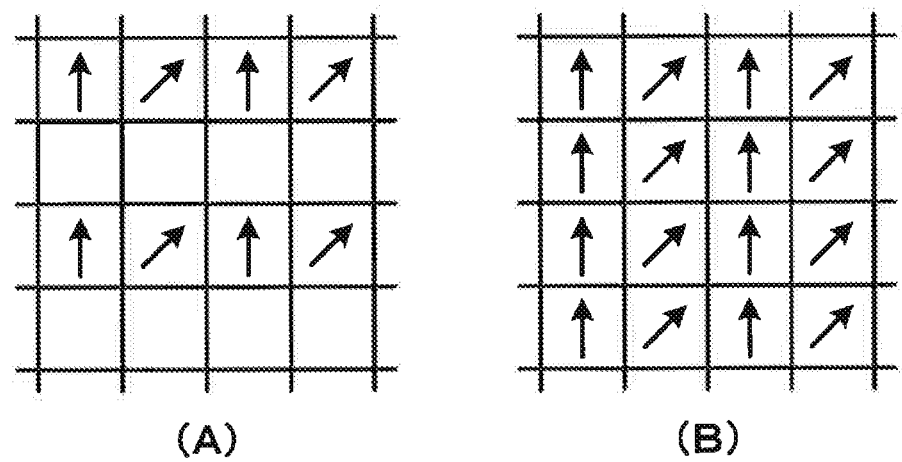
FIG. 18 is a diagram illustrating an image supplied from the imaging unit and an image subjected to an interpolation process.

The image phase adjustment unit 371 performs an image interpolation process for the lines of the unpolarized image in which no polarized image is obtained on the images supplied from the imaging units 31 and 32 to generate the polarized images including the pixels of which the polarization directions are a plurality of different directions. FIG. 18 illustrates an image supplied from the imaging unit and an image subjected to an interpolation process. FIG. 18(A) illustrates the polarization directions of the image supplied from the imaging unit 31. FIG. 18(B) illustrates the polarization directions of the image subjected to the interpolation process. The image phase adjustment unit 371 performs interpolation using the pixels of the polarized image adjacent on the upper or lower side and generates a polarized image formed by the pixels having two polarization directions using average values of the pixel values of the pixels adjacent on the upper side and the pixel values of the pixels adjacent on the lower side as average values of the pixel positions of the unpolarized image. The image phase adjustment unit 371 also performs the image interpolation process on the image supplied from the imaging unit 32 in this way to generate a polarized image formed by the pixels of which the polarization directions are two different directions from those of the image supplied from the imaging unit 31.

Further, based on the disparity map, the image phase adjustment unit 371 matches the phases of the polarized image subjected to the interpolation process on the image from the imaging unit 31 and the polarized image subjected to the interpolation process on the image from the imaging unit 32. FIG. 19 is a diagram for describing a phase adjustment process. FIG. 19(A) illustrates a part of the polarized image subjected to the interpolation process on the image supplied from the imaging unit 31. FIG. 19(B) illustrates a part of the polarized image subjected to the interpolation process on the image supplied from the imaging unit 32. FIG. 19(C) exemplifies a part of the disparity map. Disparity values (parallax amount) of the disparity map have one-to-one correspondence with the depth values of the depth map, and thus can be converted easily in both directions from the interval "LB" of the standard position of the two imaging units and the focal distance "f" of the imaging units, as described above. The parallax amount indicates a relation between the pixels on the images supplied from the imaging units 31 and 32 and corresponding to the same portion of the subject. For example, a pixel Pg1 (not illustrated) which is a pixel on the image supplied from the imaging unit 31 and corresponds to a pixel Pg2 (not illustrated) on the image supplied from the imaging unit 32 can be determined referring to the parallax amount of the disparity map. Here, when the value of the parallax amount is assumed to be "2 (pixels)," the pixel Pg1 located on the right side of 2 pixels from the pixel Pg2 corresponds to the same portion of the subject. Accordingly, the image phase adjustment unit 371 adjusts the phase of the image supplied from the imaging unit 32 and subjected to the interpolation process with reference to the disparity map to generate a phase-matched image, as illustrated in FIG. 19(D), in which the phase of the image matches the phase of the image supplied from the imaging unit 31 and subjected to the interpolation process. Here, when the disparity map has the values illustrated in FIG. 19(C), the upper half is "1 (pixel)" and the lower half is "2 (pixels)." Accordingly, the image phase adjustment unit 371 generates an image in which the phase is matched by performing a process of deviating the upper half of the image supplied from the imaging unit 32 and subjected to the interpolation process to the right side by "1 (pixel)" and a process of deviating the lower half to the right side by "2 (pixels)."

The image phase adjustment unit 371 performs the above-described process to generate a polarized image of which the polarization directions are two different directions and a polarized image of which the polarization directions are two different directions and the phase of this image is matched, and outputs the polarized images to the normal-line map generation processing unit 375. That is, the image phase adjustment unit 371 outputs the multi-polarized images from which an influence of the parallax of the subject is excluded to the normal-line map generation processing unit 375.

The normal-line map generation processing unit 375 generates the normal-line map based on the polarized images having the plurality of polarization directions and supplied from the image phase adjustment unit 371 and outputs the normal-line map to the map unifying unit 39.

The map unifying unit 39 performs the process of unifying the depth map and the normal-line map. The map unifying unit 39 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 39 generates the depth map with precision equal to or greater than the depth map supplied from the depth map generation unit 35 by including the estimated depth value in the depth map supplied from the depth map generation unit 35.

Figure 20:
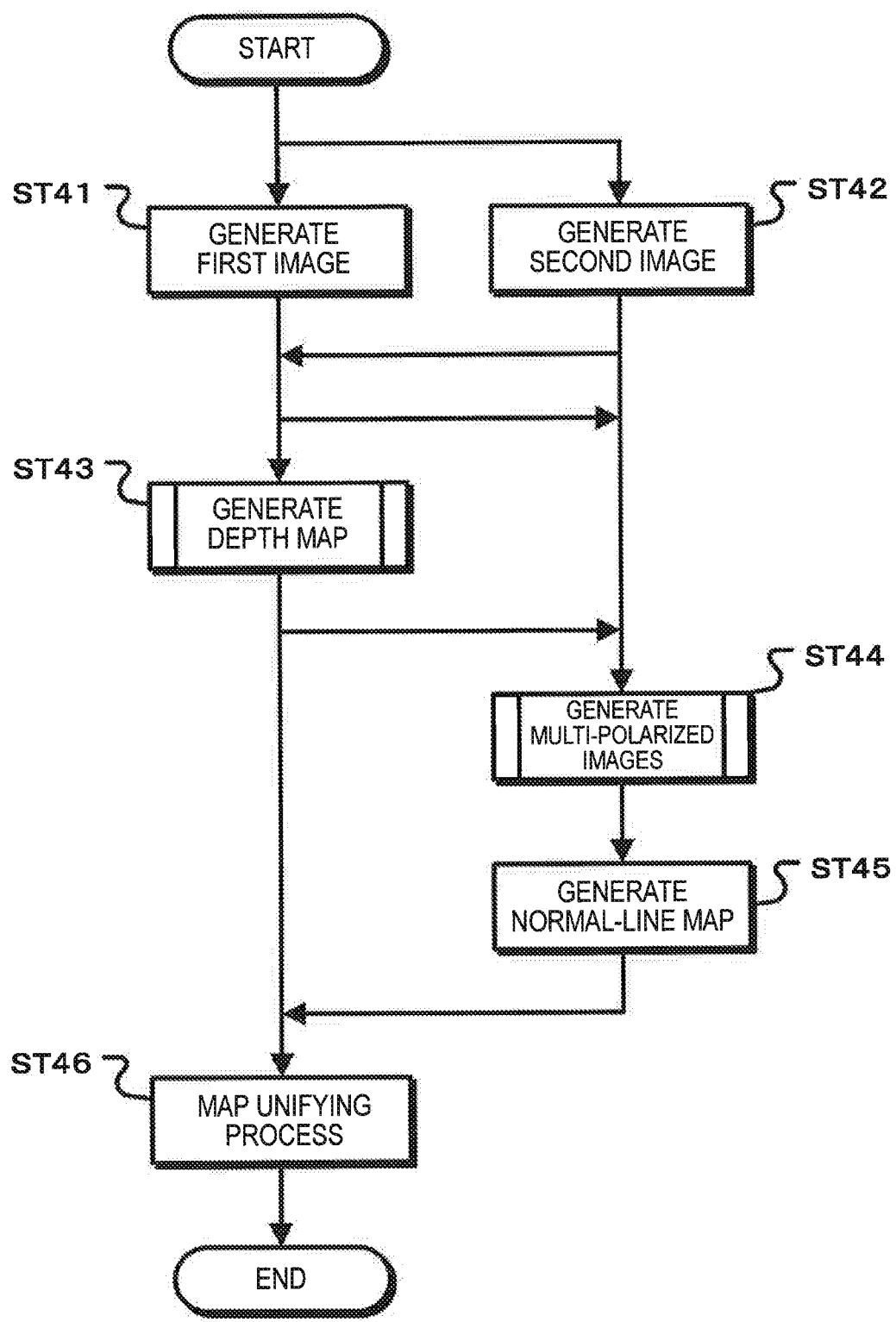
FIG. 20 is a flowchart illustrating a processing operation according to the second embodiment.

FIG. 20 is a flowchart illustrating a processing operation according to the second embodiment. In step ST41, the imaging unit 31 generates the first image. The imaging unit 31 generates the first image including the first pixel group formed by the pixels with the polarization characteristics and the second pixel group formed by the pixels having the different polarization direction from the polarization direction of the first pixel group or the pixels with no polarization characteristics. In step ST42, the imaging unit 32 generates the second image including the third pixel group formed by the pixels of which the polarization direction is different from the polarization direction of the first image at the position corresponding to the first pixel group and the fourth pixel group formed by the pixels with the same configuration as the configuration of the second pixel group at the position corresponding to the second pixel group.

Figure 21:
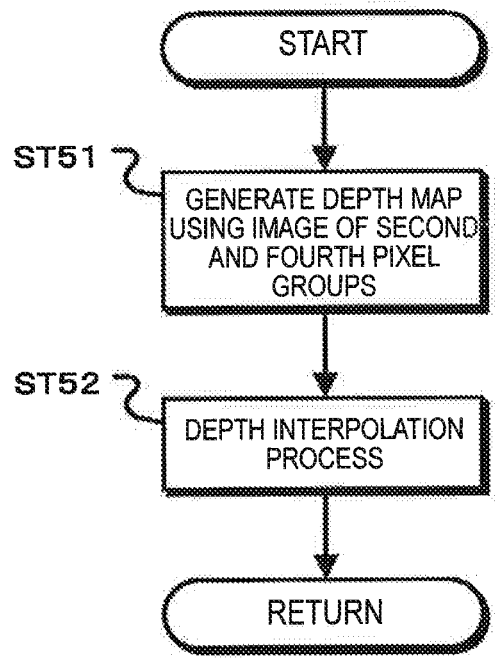
FIG. 21 is a flowchart illustrating a depth map generation process.

In step ST43, the depth map generation unit 35 generates the depth map. FIG. 21 is a flowchart illustrating a depth map generation process. In step ST51, the depth map generation unit 35 generates the depth map using the second and fourth pixel groups. The depth map generation unit 35 performs the matching process using the image of the second and fourth pixel groups to calculate the distance (depth value) to the subject for each pixel and generates the depth map.

In step ST52, the depth map generation unit 35 performs the depth interpolation process. The depth map generation unit 35 calculates a depth value in the pixels of the first (third) pixel group through the interpolation process using the depth values calculated for the pixels of the second (fourth) pixel group. In this way, the depth map generation unit 35 performs the depth interpolation process to generate the depth map indicating the depth value for each of the pixels of the first (third) pixel group and the second (fourth) pixel group.

Figure 22:
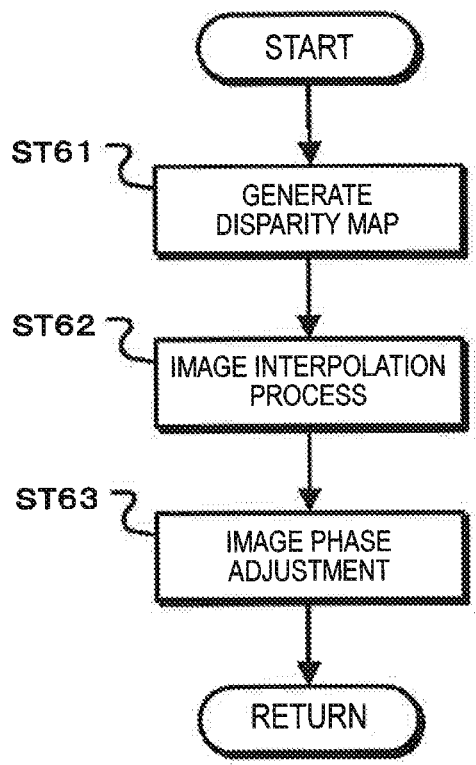
FIG. 22 is a flowchart illustrating a multi-polarized image generation process.

In step ST44 of FIG. 20, the normal-line map generation unit 37 generates the multi-polarized images. FIG. 22 is a flowchart illustrating a multi-polarized image generation process. In step ST61, the normal-line map generation unit 37 generates the disparity map. The normal-line map generation unit 37 converts the depth map generated in step ST43 of FIG. 20 into the disparity map. The normal-line map generation unit 37 may use the deviation amount at each pixel position obtained through the matching process performed at the time of the generation of the disparity map.

In step ST62, the normal-line map generation unit 37 performs the image interpolation process. The normal-line map generation unit 37 performs the image interpolation process on the first image supplied from the imaging unit 31 and the second image supplied from the imaging unit 32 at the pixel positions of the unpolarized image at which no polarized image is obtained to generate the polarized image.

In step ST63, the normal-line map generation unit 37 performs the image phase adjustment. The normal-line map generation unit 37 moves the image based on the disparity map and matches the image phases of the polarized image subjected to the interpolation process on the first image and the polarized image subjected to the interpolation process on the second image to generate the multi-polarized image from which the influence of the parallax is excluded.

In step ST45 of FIG. 20, the normal-line map generation unit 37 generates the normal-line map. The normal-line imp generation unit 37 generates the normal-line map based on the multi-polarized images generated in step ST44.

In step ST46, the map unifying unit 39 performs the map unifying process. The map unifying unit 39 estimates the depth value corresponding to the pixel in which the depth value is not obtained by tracking the surface shape of the subject using the pixel in which the depth value is obtained as a starting point based on the depth value indicated in the depth map and the surface shape of the subject indicated in the normal-line map. The map unifying unit 39 includes the estimated depth value in the depth map.

As described above, according to the second embodiment, for example, even when the polarized images are generated by the first and second imaging units, the depth map generation unit 35 can generate the depth map. The normal-line map generation unit 37 can align the phases of the images to generate the normal-line map based on the multi-polarized images from which the influence of the parallax is excluded. Accordingly, by unifying the generated depth map and the generated normal-line map, it is possible to generate the highly precise depth map with precision equal to or greater than the depth map generated by the depth map generation unit 35, that is, the depth map in which the depth value is stored at each pixel of the subject region. Further, it is possible to acquire the image in which the number of pixels is not reduced while generating the highly precise depth map.

Further, since only the average filtering is performed in the maximum two polarization directions in the pixels of the image sensor of the imaging unit 31 and the image sensor of the imaging unit 32, the influence of the average filtering can be suppressed and the highly precise depth map can be generated.

<3-2. First Modification Example of Second Embodiment>

In the above-described embodiment, the configuration in which the image sensor configured with the pixels of the single color is used in the imaging units 31 and 32 has been exemplified, but a configuration in which an image sensor configured to include pixels of a plurality of colors may be used. Next, a case in which an image sensor including red, blue, and green pixels formed in a Bayer array is used in the imaging units 31 and 32 will be described according to a second modification example of the second embodiment. The configuration of the image processing device is assumed to have the same configuration as that of FIG. 16.

Figure 23:
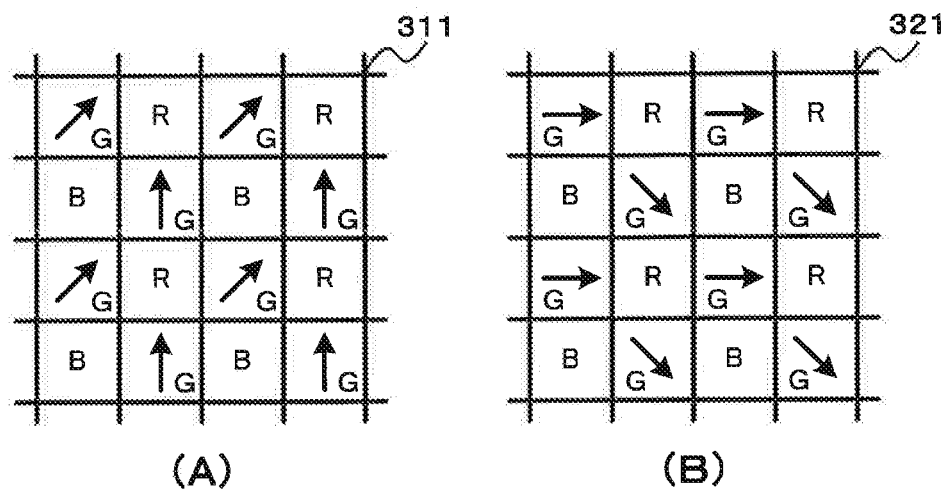
FIG. 23 is a diagram exemplifying a pixel configuration of an image sensor included in an imaging unit according to a first modification example.

FIG. 23 exemplifies a pixel configuration of an image sensor included in an imaging unit according to a first modification example. FIG. 23 illustrates a part of the image sensor. FIG. 23(A) illustrates the pixel configuration of an image sensor 311 included in the imaging unit 31 and FIG. 23 (B) illustrates the pixel configuration of an image sensor 321 included in the imaging unit 32. "R" indicates a red pixel, "G" indicates a green pixel, and "B" indicates a blue pixel.

The image sensor 311 of the imaging unit 31 is configured such that the red, blue, and green pixels are considered to have a Bayer array and polarization filters are disposed in the pixels of a predetermined color, for example, the green pixels. For example, as illustrated in FIG. 23(A), polarization directions (the polarization directions are indicated by arrows) are considered to be two different kinds of directions in the polarization filters of the image sensor 311. The imaging unit 31 generates the first image formed from an image of the pixels (green) which are the first pixel group and has two polarization directions and the unpolarized pixels (red and blue) of the second pixel group and outputs the first image to the depth map generation unit 35 and the normal-line map generation unit 37.

The image sensor 321 of the imaging unit 32 is configured such that the red, blue, and green pixels are considered to have a Bayer array and polarization filters are disposed in the green pixels. For example, as illustrated in FIG. 23(B), the polarization filters of the image sensor 321 are configured to be in polarization directions (the polarization directions are indicated by arrows) which are two different kinds of directions from those of the polarization filters of the image sensor 311. The imaging unit 32 generates the second image formed from an image of the pixels (green) which are the third pixel group and has two different polarization directions from the polarization direction of the imaging unit 31 and the unpolarized pixels (red and blue) of the fourth pixel group and outputs the second image to the depth map generation unit 35 and the normal-line map generation unit 37.

The depth map generation unit 35 includes a preprocessing unit 351 and a depth map generation processing unit 355. The preprocessing unit 351 generates matching images to be used in a matching process using the unpolarized images of the images supplied from the imaging units 31 and 32. For example, an image interpolation process is performed using only the red pixels or the blue pixels and red or blue matching images are generated. The depth map generation processing unit 355 performs the matching process using the matching images to generate the depth map.

The normal-line map generation unit 37 includes an image phase adjustment unit 371 and a normal-line map generation processing unit 375.

The image phase adjustment unit 371 converts the depth map output from the depth map generation unit 35 into a disparity map. The image phase adjustment unit 371 determines a parallax amount based on the depth value of each pixel indicated in the depth map and generates the disparity map. Since the deviation amount is calculated for each pixel through the matching process in the depth map generation unit 35, the image phase adjustment unit 371 may acquire the deviation amount for each pixel from the depth map generation unit 35 and generate the disparity map.

The image phase adjustment unit 371 performs an image interpolation process for the unpolarized image on the images supplied from the imaging units 31 and 32 using the polarized images to generate the polarized images including the pixels of which the polarization directions are a plurality of different directions. Further, based on the disparity map, the image phase adjustment unit 371 matches the phases of the polarized image subjected to the interpolation process on the image from the imaging unit 31 and the polarized image subjected to the interpolation process on the image from the imaging unit 31 and generates multi-polarized images from which the influence of the parallax of the subject is excluded. The image phase adjustment unit 371 outputs the generated multi-polarized images to the normal-line map generation processing unit 375.

The normal-line map generation processing unit 375 generates the normal-line map based on the polarized images having the plurality of polarization directions and supplied from the image phase adjustment unit 371 and outputs the normal-line map to the map unifying unit 39.

The map unifying unit 39 performs the process of unifying the depth map and the normal-line map. The map unifying unit 39 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 39 generates the depth map with precision equal to or greater than the depth map supplied from the depth map generation unit 35 by including the estimated depth value in the depth map supplied from the depth map generation unit 35.

In this way, according to the first modification example, even when the image sensor including the pixels of the plurality of colors is used, the depth map generation unit 35 can generate the depth map. The normal-line map generation unit 37 can align the phases of the images to generate the normal-line map based on the multi-polarized images from which the influence of the parallax is excluded. Accordingly, by unifying the generated depth map and the generated normal-line map, it is possible to generate the highly precise depth map with precision equal to or greater than the depth map generated by the depth map generation unit 35.

<3-3. Second Modification Example of Second Embodiment>

Next, as a second modification example of the second embodiment, a case in which the polarization directions are different between the first pixel group of the first image supplied from the imaging unit 31 and the third pixel group of the second image supplied from the imaging unit 32 and the polarization directions of the second pixel group of the first image and the fourth pixel group of the second image are the same polarization directions which are different from the polarization directions of the first and second pixel groups will be described. The configuration of the image processing device is the same as the configuration of FIG. 16.

Figure 24:
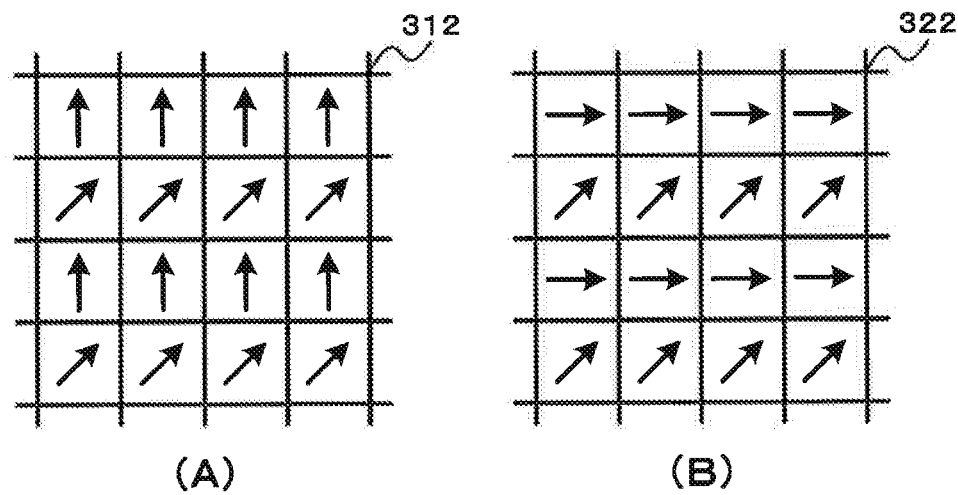
FIG. 24 is a diagram exemplifying a pixel configuration of an image sensor included in an imaging unit according to a second modification example.

FIG. 24 exemplifies a pixel configuration of an image sensor included in an imaging unit according to the second modification example. FIG. 24 illustrates a part of the image sensor. FIG. 24(A) illustrates the pixel configuration of an image sensor 312 included in the imaging unit 31 and FIG. 24(B) illustrates the pixel configuration of an image sensor 322 included in the imaging unit 32.

The image sensor 312 of the imaging unit 31 is configured such that a polarization filter is disposed in each pixel. For example, as illustrated in FIG. 24(A), the polarization filters of the image sensor 312 are formed in two different polarization directions (the polarization directions are indicated by arrows). The pixels in the same lines are configured to have the same polarization directions. The imaging unit 31 generates the first image formed by lines of the first pixel group having one polarization direction and lines of the second pixel group having another polarization direction and outputs the first image to the depth map generation unit 35 and the normal-line map generation unit 37.

The image sensor 322 of the imaging unit 32 is configured such that a polarization filter is disposed in each pixel. For example, as illustrated in FIG. 24(B), the polarization filters of the image sensor 322 are formed in different polarization directions (the polarization directions are indicated by arrows) from the same directions as the polarization directions of the image sensor 312. The pixels in the same lines are configured to have the same polarization directions. The imaging unit 32 generates the second image formed by lines of the third pixel group having the different polarization direction from the polarization direction of the imaging unit 31 and lines of the fourth pixel group having the same polarization direction as the second pixel group of the imaging unit 31 and outputs the second image to the depth map generation unit 35 and the normal-line map generation unit 37. Accordingly, in the case of FIG. 24, the polarization image having three polarization directions is supplied to the normal-line map generation unit 37. FIG. 24 exemplifies a case in which the same polarization direction is the upper right direction in the image sensors 312 and 322.

The depth map generation unit 35 includes a preprocessing unit 351 and a depth map generation processing unit 355. The preprocessing unit 351 generates matching images to be used in a matching process using the images supplied from the imaging units 31 and 32. The preprocessing unit 351 performs the image interpolation process using only the images of the pixels having the same polarization direction in the imaging units 31 and 32 to generate the matching images. The depth map generation processing unit 355 performs the matching process using the matching images to generate the depth map.

The normal-line map generation unit 37 includes an image phase adjustment unit 371 and a normal-line map generation processing unit 375.

The image phase adjustment unit 371 generates the polarized images from which the influence of the parallax is excluded since the parallax is generated in accordance with the difference between the positions of the imaging units 31 and 32. The image phase adjustment unit 371 converts the depth map output from the depth map generation unit 35 into a disparity map. The image phase adjustment unit 371 determines a parallax amount based on the depth value of each pixel indicated in the depth map and generates the disparity map. Since the deviation amount is calculated for each pixel through the matching process in the depth map generation unit 35, the image phase adjustment unit 371 may acquire the deviation amount for each pixel from the depth map generation unit 35 and generate the disparity map.

Based on the disparity map, the image phase adjustment unit 371 matches the phases of the polarized image from the imaging unit 31 and the polarized image from the imaging unit 32 and outputs the multi-polarized images from which the influence of the parallax of the subject is excluded to the normal-line map generation processing unit 375.

The normal-line map generation processing unit 375 generates the normal-line map based on the polarized images having the plurality of polarization directions and supplied from the image phase adjustment unit 371 and outputs the normal-line map to the map unifying unit 39.

The map unifying unit 39 performs the process of unifying the depth map and the normal-line map. The map unifying unit 39 estimates the depth value corresponding to a pixel in which the depth value is not obtained by tracking the surface shape of the subject using a pixel in which the depth value is obtained as a starting point based on the surface shape of the subject indicated in the normal-line map and the depth value indicated in the depth map. The map unifying unit 39 generates the depth map with precision equal to or greater than the depth map supplied from the depth map generation unit 35 by including the estimated depth value in the depth map supplied from the depth map generation unit 35.

In this way, according to the second modification example, even when the image supplied from the imaging unit 31 is the image having the plurality of polarization directions and the image supplied from the imaging unit 32 is the image having the different polarization direction from the same polarization directions as that of the imaging unit 31, the depth map can be generated. The normal-line map generation unit 37 can align the phases of the images to generate the normal-line map based on the multi-polarized images from which the influence of the parallax is excluded. Accordingly, by unifying the generated depth map and the generated normal-line map, it is possible to generate the highly precise depth map with precision equal to or greater than the depth map generated by the depth map generation unit 35.

Further, even in the second embodiment, the normal-line map may be generated by eliminating the uncertainty of 180 degrees using the depth map as in the first embodiment. By eliminating the uncertainty of 180 degrees, the depth map can be generated with high precision even in the second embodiment.

<4. Third Embodiment>

In the above-described first and second embodiments, the configuration in which the plurality of imaging units are provided in the image processing device has been exemplified, but the imaging units may be configured to be separable from each other.

Figure 25:
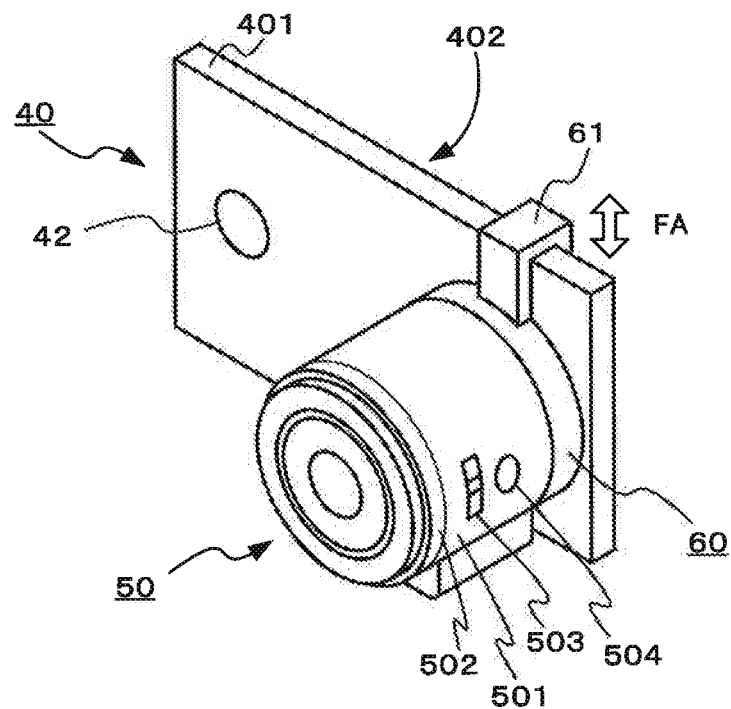
FIG. 25 is a diagram exemplifying an exterior according to a third embodiment.

FIG. 25 exemplifies an exterior according to a third embodiment. In FIG. 25, for example, a smartphone is used as an image processing device.

An image processing device 40 includes a signal processing unit, a communication unit, and a control unit (none of which is illustrated) inside an external casing 401 formed in a substantially rectangular case shape. A display panel 402 is provided on one surface (front surface) of the external casing 401. The display panel 402 is configured using a touch panel, and predetermined positions of the display panel 402 are manipulated to perform various functions. An imaging unit 42 is provided on the other surface (rear surface) of the external casing 401.

An imaging device 50 includes an imaging optical system, an imaging unit, a signal processing unit, a communication unit, and a control unit (none of which is illustrated) inside an external cylindrical unit 501 formed in a cylindrical shape. A control ring 502 in a circular shape is provided in the front end portion of the external cylindrical unit 501. The imaging device 50 changes a focus position or a zoom position according to rotation of the control ring 502. A zoom button 503 and a shutter button 504 are provided on a side surface of the external cylindrical unit 501.

An attachment mechanism unit 60 integrally attaching the image processing device 40 and the imaging device 50 is provided in the imaging device 50. An attachment member 61 is provided in the attachment mechanism unit 60 and is configured to be movable in a direction of an arrow FA. A user moves attachment member 61 in the direction of the arrow FA to lock the attachment member 61 into the external casing 401 of the image processing device 40 and integrally fix the imaging device 50 to, for example, the rear surface side of the image processing device 40. By integrally fixing the imaging device 50 to the image processing device 40 in this way, a stereo image can be generated by the imaging unit 42 and the imaging device 50. The user moves the attachment member 61 locked into the external casing 401 of the image processing device 40 in the opposite direction to the locking direction to separate the image processing device 40 from the imaging device 50.

Figure 26:
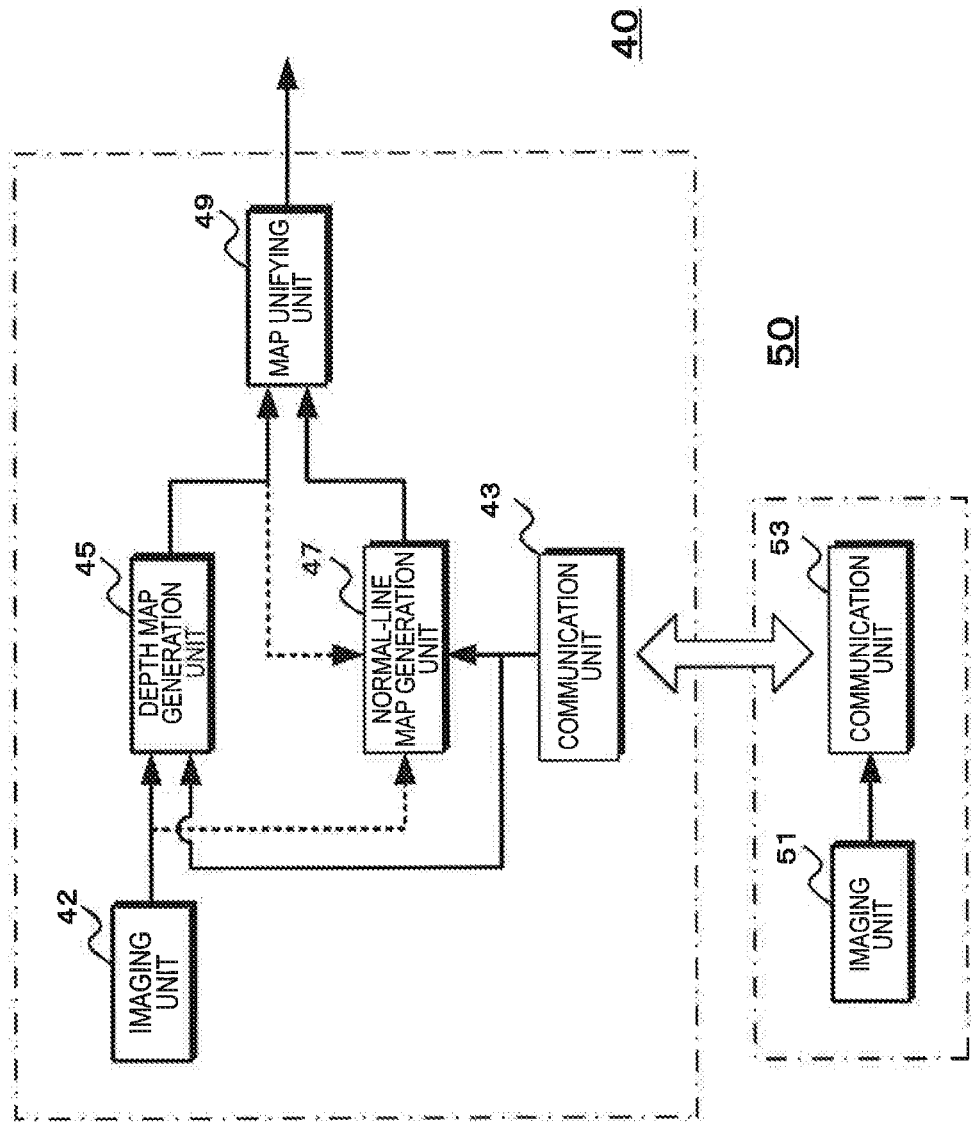
FIG. 26 is a diagram exemplifying a configuration according to the third embodiment.

FIG. 26 exemplifies a configuration according to the third embodiment. The image processing device 40 includes the imaging unit 42, a communication unit 43, a depth map generation unit 45, a normal-line map generation unit 47, and a map unifying unit 49. The imaging device 50 includes an imaging unit 51 and a communication unit 53.

The imaging unit 42 of the image processing device 40 corresponds to, for example, the imaging unit 22 according to the first embodiment or the imaging unit 32 according to the second embodiment. When the imaging unit 42 corresponds to the imaging unit 22, the imaging unit 42 outputs a generated image to the depth map generation unit 45. When the imaging unit 42 corresponds to the imaging unit 32, the imaging unit 42 outputs a generated image to the depth map generation unit 45 and the normal-line map generation unit 47.

The imaging unit 51 of the imaging device 50 corresponds to, for example, the imaging unit 21 according to the first embodiment or the imaging unit 31 according to the second embodiment. The imaging unit 51 outputs a generated image to the communication unit 53. The communication unit 53 is configured to perform near field communication (NFC) or wireless communication such as Wi-Fi communication. The communication unit 53 transmits an image generated by the imaging unit 51 to the image processing device 40.

The communication unit 43 of the image processing device 40 has the same configuration as the configuration of the communication unit 53 of the imaging device 50. The communication unit 43 receives a wireless signal transmitted from the communication unit 53 of the imaging device 50 and outputs an image transmitted from the imaging device 50 to the depth map generation unit 45 and the normal-line map generation unit 47.

The depth map generation unit 45 performs the same process as the depth map generation unit 25 according to the first embodiment or the depth map generation unit 35 of the second embodiment to generate a depth map and outputs the depth map to the map unifying unit 49.

The normal-line map generation unit 47 performs the same process as the normal-line map generation unit 27 according to the first embodiment or the normal-line map generation unit 37 according to the second embodiment to generate a normal-line map and outputs the normal-line map to the map unifying unit 49.

The map unifying unit 49 performs the same process as the map unifying unit 29 according to the first embodiment or the map unifying unit 39 according to the second embodiment to generate the depth map with precision equal to or greater than the depth map generated by the depth map generation unit 45 based on the depth map and the normal-line map and outputs the depth map.

According to the third embodiment, even in the configuration in which the imaging unit is separable, it is possible to acquire an image in which the number of pixels is not reduced while generating the highly precise depth map. Accordingly, for example, since the imaging device which generates a polarized image having three or more polarization directions is attached to an information processing device such as a smartphone and the highly precise depth map can be generated, it is possible to expand a function of a known information processing device.

An imaging device may be configured using parts of the configurations according to the above-described embodiments. For example, the imaging device is configured to include a first imaging unit which has a pixel configuration including pixels with different polarization characteristics, a second imaging unit which has a different pixel configuration from the pixel configuration of the first imaging unit, and an image processing unit which performs image processing using the first image generated by the first imaging unit and the second image generated by the second imaging unit. In the imaging device, the pixel configuration of the first imaging unit is, for example, a pixel configuration including the first pixel group formed by the pixels with the polarization characteristics and the second pixel group formed by the pixels having the different polarization directions from the polarization direction of the first pixel group or the pixels with no polarization characteristics. The pixel configuration of the second imaging unit is the pixel configuration including the third pixel group formed by the pixels having the different polarization direction from the polarization direction of the first image at the position corresponding to the first pixel group and the fourth pixel group formed by the pixels with the same configuration as the configuration of the second pixel group at the position corresponding to the second pixel group. When the imaging device has such a configuration, it is possible to easily generate an image which is a processing target used to acquire an image in which the number of pixels is not reduced while generating the highly precise depth map. When the image processing unit of the imaging device generates the depth map and the normal-line map and performs the process of unifying the depth map and the normal-line map, as described above, the highly precise depth map and the image in which the number of pixels is not reduced can be output from the imaging device. The image processing device may have the same configuration as the configuration of the imaging device.

The series of processes described in the present specification can be executed by hardware, software, or a combined configuration of hardware and software. When the processes are executed by software, a program recording a processing sequence is installed in a memory in a computer incorporated in dedicated hardware to be executed. Alternatively, the program can be installed in a general computer capable of executing various processes to be executed.

For example, the program can be recorded in advance in a hard disk, a solid state drive (SSD), or a read-only memory (ROM) which is a recording medium. Alternatively, the program can be stored (recorded) temporarily or permanently in a removable recording medium such as a flexible disc, a compact disc read only memory (CD-ROM), a magneto optical (MO) disc, a digital versatile disc (DVD), a Blu-ray disc ((BD); registered trademark), a magnetic disk, or a semiconductor memory card. Such a removable recording medium can be provided as so-called package software. The program may be installed from a removable recording medium into a computer and may also be transmitted from a download site to a computer in a wireless or wired manner via a network such as a local area network (LAN) or the Internet. The program transmitted in this way can be received in a computer and can be installed to a recording medium such as an internal hard disk.

The present technology is not construed as limited to the above-described embodiments. In the embodiments, the present technology is disclosed in exemplified forms and it should be apparent to those skilled in the art that modifications and substitutions of the embodiments can be made within the scope of the present technology without departing from the gist of the present technology. That is, the gist of the present technology is determined referring to the appended claims.

Additionally, the image processing device according to the present technology may also be configured as below.

(1)
An image processing device including:
a depth map generation unit configured to generate a depth map through a matching process using a first image generated by a first imaging unit which has a pixel configuration including pixels having different polarization directions and a second image generated by a second imaging unit which has a different pixel configuration from the pixel configuration of the first imaging unit;
a normal-line map generation unit configured to generate a normal-line map based on a polarization state of a polarized image of at least one of the first and second images generated by the depth map generation unit; and
a map unifying unit configured to perform a process of unifying the depth map generated by the depth map generation unit and the normal-line map generated by the normal-line map generation unit.

(2)
The image processing device according to (1),
wherein the normal-line map generation unit generates the normal-line map based on luminance of the polarized image having three or more polarization directions.

(3)
The image processing device according to (1) or (2),
wherein the map unifying unit estimates a depth value not indicated in the depth map from a shape determined based on a depth value indicated in the depth map and the normal-line map.

(4)
The image processing device according to any of (1) to (3),
wherein the first image is an image generated by the first imaging unit including the pixels having three or more polarization directions,
wherein the second image is an image generated by the second imaging unit including pixels with no polarization characteristics, and
wherein the normal-line map generation unit generates the normal-line map based on the first image.

(5)
The image processing device according to (4),
wherein the depth map generation unit generates an unpolarized image from the first image and performs the matching process using the unpolarized image and the second image.

(6)
The image processing device according to (5),
wherein the depth map generation unit performs edge extraction on each of the unpolarized image and the second image and performs the matching process using an edge-extracted image of the unpolarized image and an edge-extracted image of the second image.

(7)
The image processing device according to any of (4) to (6),
wherein the second image is an image generated by the second imaging unit in which color filters of the same color are provided in all of the pixels or the second imaging unit in which the color filters are not provided, and
wherein the depth map generation unit performs the matching process using an unpolarized image generated from the second image.

(8)
The image processing device according to (3),
wherein the first image is an image generated by the first imaging unit which has a pixel configuration including a first pixel group formed by pixels with polarization characteristics and a second pixel group formed by pixels having a polarization direction different from a polarization direction of the first pixel group or pixels with no polarization characteristics, and
wherein the second image is an image generated by the second imaging unit which has a pixel configuration including a third pixel group formed by pixels having a different polarization direction from the polarization direction of the first image at a position corresponding to the first pixel group and a fourth pixel group formed by pixels with the same configuration as a configuration of the second pixel group at a position corresponding to the second pixel group.

(9)
The image processing device according to (8),
wherein the depth map generation unit performs the matching process between images having the same polarization direction or images with no polarization characteristics by using an image of the second pixel group in the first image and an image of the fourth pixel group in the second image.

(10)
The image processing device according to (8) or (9), further including:
an image phase adjustment unit configured to generate a polarized image having a plurality of polarization directions by matching phases of an image of the first pixel group in the first image and an image of the third pixel group in the second image based on a parallax amount of the first image and the second image,
wherein the normal-line map generation unit generates the normal-line map based on a polarization state of the polarized image generated by the image phase adjustment unit.

(11)
The image processing device according to any of (8) to (10),
wherein, in a case of an image in which the second and fourth pixel groups have no polarization characteristics, an image having three or more polarization directions of the first and third pixel groups in total is set.

(12)
The image processing device according to any of (8) to (11),
wherein, in a case of an image in which the second and fourth pixel groups have no polarization characteristics, the image phase adjustment unit generates an image of the second pixel group through an interpolation process using an image of the first pixel group, generates an image of the fourth pixel group through an interpolation process using an image of the third pixel group, and generates the polarized image using the interpolated images.

(13)
The image processing device according to any of (8) to (12),
wherein the first and third pixel groups are pixels of a predetermined color and the second and fourth pixel groups are pixels of different colors.

(14)
The image processing device according to any of (3) to (13),
wherein the normal-line map generation unit generates the normal-line map using the depth map generated by the depth map generation unit.

(15)
The image processing device according to any of (1) to (14), further including:
the first imaging unit configured to generate the first image; and the second imaging unit configured to generate the second image.

(16) The image processing device according to any of (1) to (15), further including:
a communication unit configured to perform communication with an external device in which one of the first and second imaging units is provided and acquire an image generated by the imaging unit provided in the external device; and
another imaging unit different from the imaging unit provided in the external device.

INDUSTRIAL APPLICABILITY

In the image processing device, the image processing method, and the imaging device according to the present technology, a depth map is generated through a matching process using a first image generated by a first imaging unit which has a pixel configuration including pixels having different polarization directions and a second image generated by a second imaging unit which has a different pixel configuration from the pixel configuration of the first imaging unit. A normal-line map is generated based on a polarization state of a polarized image of at least one of the first and second images. A process of unifying the generated depth map and the generated normal-line map is performed. Therefore, it is possible to acquire an image in which the number of pixels is not reduced while generating the highly precise depth map. Accordingly, the present technology is suitable for a device or the like acquiring the 3-dimensional shape of a subject.

REFERENCE SIGNS LIST 10, 20, 30, 40 image processing device
15, 25, 35, 45 depth map generation unit
17, 27, 37, 47 normal-line map generation unit
19, 29, 39, 49 map unifying unit
21, 22, 31, 32, 42, 51 imaging unit
43, 53 communication unit
50 imaging device
53 communication unit
60 attachment mechanism unit
61 attachment member
210, 220, 221, 310, 311, 312, 320, 321, 322 image sensor
251, 351 preprocessing unit
255, 355 depth map generation processing unit
275, 276, 375 normal-line map generation processing unit
371 image phase adjustment unit
375 normal-line map generation processing unit
401 external casing
402 display panel
501 external cylindrical unit
502 control ring
503 zoom button
504 shutter button

The invention claimed is:

1. An image processing device comprising:
a depth map generation unit configured to generate a depth map through a matching process using a first image generated by a first imaging unit which has a pixel configuration including pixels having different polarization directions and a second image generated by a second imaging unit which has a different pixel configuration from the pixel configuration of the first imaging unit;
a normal-line map generation unit configured to generate a normal-line map based on a polarization state of a polarized image of at least one of the first and second images generated by the depth map generation unit; and
a map unifying unit configured to perform a process of unifying the depth map generated by the depth map generation unit and the normal-line map generated by the normal-line map generation unit,
wherein the first image is an image generated by the first imaging unit which has a pixel configuration including a first pixel group formed by pixels with first polarization characteristics,
wherein the second image is an image generated by the second imaging unit which has a pixel configuration including a second pixel group formed by pixels with second polarization characteristics different from the first polarization characteristics at a position corresponding to the first pixel group,
wherein the first polarization characteristics include a first polarization direction and the second polarization characteristics include a second polarization direction different from the first polarization direction, and
wherein the depth map generation unit, the first imaging unit, the second imaging unit, the normal-line map generation unit, and the map unifying unit are each implemented via at least one processor.

2. The image processing device according to claim 1, wherein the normal-line map generation unit generates the normal-line map based on luminance of a polarized image having three or more polarization directions.

3. The image processing device according to claim 2, wherein the map unifying unit estimates a depth value not indicated in the depth map from a shape determined based on a depth value indicated in the depth map and the normal-line map.

4. The image processing device according to claim 3, wherein the first image is an image generated by the first imaging unit including pixels having three or more polarization directions,
wherein the second image is an image generated by the second imaging unit including pixels with no polarization characteristics, and
wherein the normal-line map generation unit generates the normal-line map based on the first image.

5. The image processing device according to claim 4, wherein the depth map generation unit generates an unpolarized image from the first image and performs the matching process using the unpolarized image and the second image.

6. The image processing device according to claim 5, wherein the depth map generation unit performs edge extraction on each of the unpolarized image and the second image and performs the matching process using an edge-extracted image of the unpolarized image and an edge-extracted image of the second image.

7. The image processing device according to claim 4, wherein the second image is an image generated by the second imaging unit in which color filters of the same color are provided in all of the pixels or the second imaging unit in which the color filters are not provided, and
wherein the depth map generation unit performs the matching process using an unpolarized image generated from the second image.

8. The image processing device according to claim 3, wherein the pixel configuration of the first imaging unit further includes a third pixel group formed by pixels having a polarization direction different from the polarization direction of the first pixel group or pixels with no polarization characteristics, and wherein the pixel configuration of the second imaging unit further includes a fourth pixel group formed by pixels with a same configuration as a configuration of the third pixel group at a position corresponding to the third pixel group.

9. The image processing device according to claim 8, wherein the depth map generation unit performs the matching process between images having a same polarization direction or images with no polarization characteristics by using an image of the third pixel group in the first image and an image of the fourth pixel group in the second image.

10. The image processing device according to claim 8, further comprising:

an image phase adjustment unit configured to generate a polarized image having a plurality of polarization directions by matching phases of an image of the first pixel group in the first image and an image of the second pixel group in the second image based on a parallax amount of the first image and the second image, wherein the normal-line map generation unit generates the normal-line map based on a polarization state of the polarized image generated by the image phase adjustment unit, and wherein the image phase adjustment unit is implemented via at least one processor.

11. The image processing device according to claim 8, wherein, in a case of an image in which the second and fourth pixel groups have no polarization characteristics, an image having three or more polarization directions of the first and second pixel groups in total is set.

12. The image processing device according to claim 10, wherein, in a case of an image in which the second and fourth pixel groups have no polarization characteristics, the image phase adjustment unit generates an image of the third pixel group through an interpolation process using an image of the first pixel group, generates an image of the fourth pixel group through an interpolation process using an image of the second pixel group, and generates the polarized image using the interpolated images.

13. The image processing device according to claim 8, wherein the first and second pixel groups are pixels of a predetermined color and the second and fourth pixel groups are pixels of different colors.

14. The image processing device according to claim 3, wherein the normal-line map generation unit generates the normal-line map using the depth map generated by the depth map generation unit.

15. The image processing device according to claim 1, wherein the first imaging unit is configured to generate the first image, and the second imaging unit is configured to generate the second image.

16. The image processing device according to claim 1, further comprising:

a communication unit configured to perform communication with an external device in which one of the first imaging unit and the second imaging unit is provided and acquire an image generated by the imaging unit provided in the external device; and another imaging unit different from the imaging unit provided in the external device, wherein the communication unit and the another imaging unit are each implemented via at least one processor.

17. An image processing method comprising:

generating a depth map by performing a matching process using a first image generated by a first imaging unit which has a pixel configuration including pixels having different polarization directions and a second image generated by a second imaging unit which has a different pixel configuration from the pixel configuration of the first imaging unit;

generating a normal-line map based on a polarization state of a polarized image of at least one of the generated first and second images; and performing a process of unifying the depth map and the normal-line map, wherein the first imaging unit has a pixel configuration including a first pixel group formed by pixels with polarization characteristics, wherein the second imaging unit has a pixel configuration including a second pixel group formed by pixels with second polarization characteristics different from the first polarization characteristics at a position corresponding to the first pixel group, and wherein the first polarization characteristics include a first polarization direction and the second polarization characteristics include a second polarization direction different from the first polarization direction.

18. An imaging device comprising:

a first imaging unit configured to have a pixel configuration including pixels having different polarization directions;

a second imaging unit configured to have a different pixel configuration from the pixel configuration of the first imaging unit; and an image processing unit configured to:
generate a depth map through a matching process using a first image generated by the first imaging unit and a second image generated by the second imaging unit;
generate a normal-line map based on a polarization state of a polarized image of at least one of the first and second images; and
unify the depth map and the normal-line map, wherein the first imaging unit has a pixel configuration including a first pixel group formed by pixels with polarization characteristics, wherein the second imaging unit has a pixel configuration including a second pixel group formed by pixels with second polarization characteristics different from the first polarization characteristics at a position corresponding to the first pixel group, wherein the first polarization characteristics include a first polarization direction and the second polarization characteristics include a second polarization direction different from the first polarization direction, and wherein the first imaging unit, the second imaging unit, and the image processing unit are each implemented via at least one processor.

19. The imaging device according to claim 18, wherein the pixel configuration of the first imaging unit further includes a third pixel group formed by pixels having a different polarization direction from the polarization direction of the first pixel group or pixels with no polarization characteristics, and wherein the pixel configuration of the second imaging unit further includes a fourth pixel group formed by pixels with a same configuration as a configuration of the third pixel group at a position corresponding to the third pixel group.

20. An image processing device comprising:
a reception unit configured to receive a first image from an image processing device including a first imaging unit that has a pixel configuration including pixels having different polarization directions and a transmission unit that transmits the first image generated by the first imaging unit;
a second imaging unit configured to have a different pixel configuration from the pixel configuration of the first imaging unit; and
an image processing unit configured to:
  generate a depth map through a matching process using the first image received by the reception unit and a second image generated by the second imaging unit;
  generate a normal-line map based on a polarization state of a polarized image of at least one of the first and second images; and
  unify the depth map and the normal-line map,
wherein the first imaging unit has a pixel configuration including a first pixel group formed by pixels with polarization characteristics,
wherein the second imaging unit has a pixel configuration including a second pixel group formed by pixels with second polarization characteristics different from the first polarization characteristics at a position corresponding to the first pixel group,
wherein the first polarization characteristics include a first polarization direction and the second polarization characteristics include a second polarization direction different from the first polarization direction, and
wherein the reception unit, the first imaging unit, the transmission unit, the second imaging unit, and the image processing unit are each implemented via at least one processor.

* * * * *